(12) United States Patent
Mizuno

(10) Patent No.: US 8,004,954 B2
(45) Date of Patent: Aug. 23, 2011

(54) OPTICAL PICKUP, OPTICAL DISK DEVICE, COMPUTER AND OPTICAL DISK RECORDER

(75) Inventor: Sadao Mizuno, Osaka (JP)

(73) Assignee: Panasonic Corporation, Osaka (JP)

( * ) Notice: Subject to any disclaimer, the term of this patent is extended or adjusted under 35 U.S.C. 154(b) by 546 days.

(21) Appl. No.: 12/094,356

(22) PCT Filed: Nov. 20, 2006

(86) PCT No.: PCT/JP2006/323100
§ 371 (c)(1),
(2), (4) Date: May 20, 2008

(87) PCT Pub. No.: WO2007/058348
PCT Pub. Date: May 24, 2007

(65) Prior Publication Data
US 2009/0097380 A1   Apr. 16, 2009

(30) Foreign Application Priority Data
Nov. 21, 2005   (JP) .................................. 2005-335484

(51) Int. Cl.
*G11B 7/00* (2006.01)
(52) U.S. Cl. ................................ 369/112.03; 369/44.28
(58) Field of Classification Search ............. 369/112.03, 369/44.28
See application file for complete search history.

(56) References Cited

U.S. PATENT DOCUMENTS

| | | | |
|---|---|---|---|
| 6,169,714 B1 * | 1/2001 | Tanaka et al. | 369/44.28 |
| 6,518,555 B1 | 2/2003 | Kikuchi et al. | |
| 2004/0184385 A1 | 9/2004 | Katsuma et al. | |
| 2005/0180295 A1 | 8/2005 | Mimori | |

FOREIGN PATENT DOCUMENTS

| | | |
|---|---|---|
| CN | 1655258 | 8/2005 |
| JP | 11-271608 | 10/1999 |
| JP | 2003-255221 | 9/2003 |
| JP | 2004-279981 | 10/2004 |
| JP | 2005-259332 | 9/2005 |
| JP | 2006-351090 | 12/2006 |

OTHER PUBLICATIONS

International Search Report issued Jan. 16, 2007 in International (PCT) Application No. PCT/JP2006/323100.
Chinese Office Action issued Apr. 26, 2010 in Chinese Application No. 200680043370.7.

* cited by examiner

*Primary Examiner* — Van N Chow
(74) *Attorney, Agent, or Firm* — Wenderoth, Lind & Ponack, L.L.P.

(57) ABSTRACT

A diffraction grating is constituted such that directions of diffraction are disposed asymmetrically with respect to the optical axis, by causing light subjected to aperture restriction to have a difference of one half wavelength in the optical path length by making use of the fact that the difference in the optical path length experienced by the light passing through a diffraction element varies depending on the wavelength. With this constitution of the diffraction grating, aperture restriction is applied to both the light focused on an optical disk and the light reflected from the optical disk, thereby achieving an optical pickup that is capable of recording/reproducing information on/from optical disks of different types by using a single objective lens. The optical pickup prevents unnecessary light from entering a photodetector and enables the production of diffraction elements at a low cost.

18 Claims, 21 Drawing Sheets

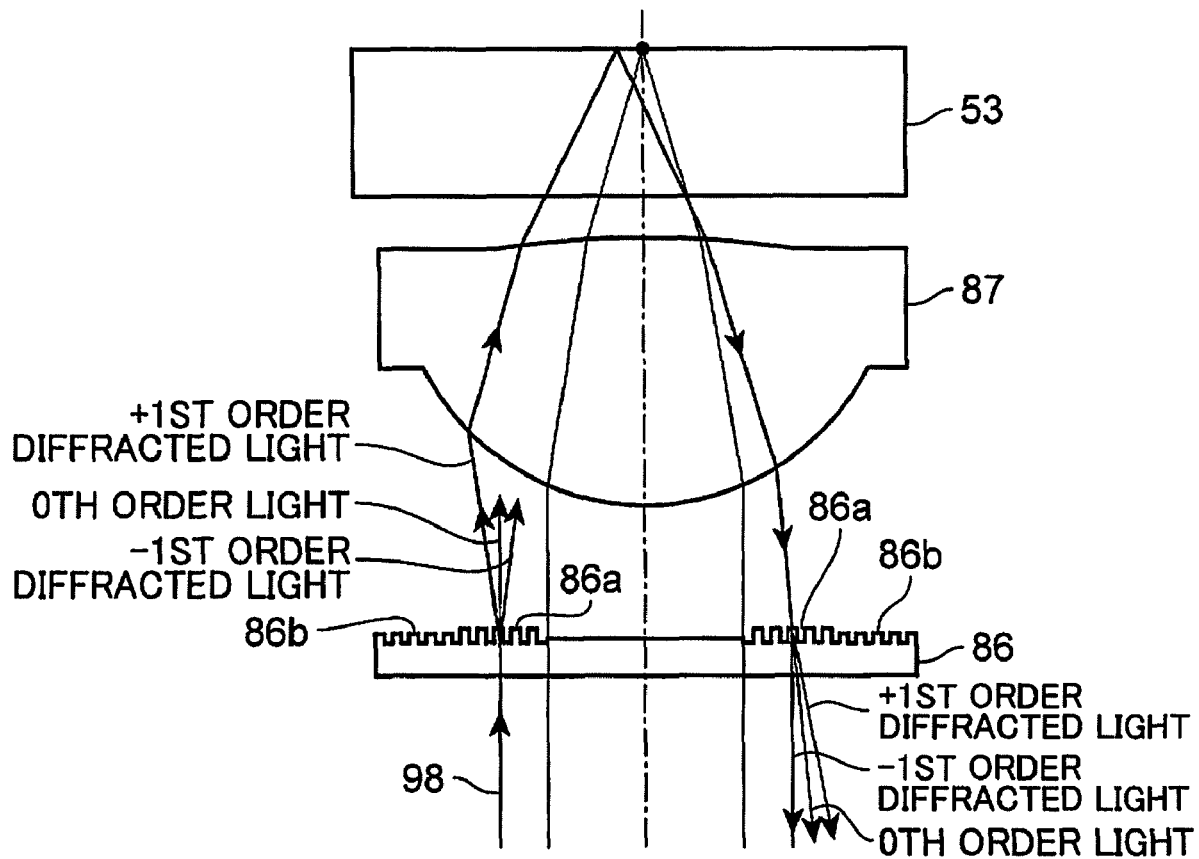

OPTICAL PICKUP, OPTICAL DISK DEVICE, COMPUTER AND OPTICAL DISK RECORDER

TECHNICAL FIELD

The present invention relates to an optical pickup that records information on an optical information medium such as an optical disk, reproduces or deletes information therefrom, an optical disk device that uses the optical pickup, a personal computer where the device is applied, and a system such as optical disk recorder that records video and audio signals.

BACKGROUND ART

With the compact disk (hereinafter referred to as CD), that may be called the first generation optical disk, information is recorded on or reproduced from (hereinafter expressed as record/reproduce) an optical disk having a protective layer 1.2 mm in thickness by using an objective lens with a numerical aperture from 0.45 to 0.5 and infrared rays of wavelength 780 nm. In this specification, the term protective layer means a transparent medium disposed between a surface whereon a light beam incident on the optical disk strikes and an information recording surface. In a digital versatile disk (hereinafter referred to as DVD), the second generation optical disk, information is recorded/reproduced on/from the optical disk having a protective layer 0.6 mm in thickness by using an objective lens with a numerical aperture of 0.6 and red light of wavelength 655 nm. In a Blue Ray disk (hereinafter referred to as BD), the third generation optical disk, information is recorded/reproduced on/from the optical disk having a protective layer 0.1 mm or 0.075 mm in thickness by using an objective lens with a numerical aperture of 0.85 and blue light of wavelength 405 nm.

The third generation optical disk, which uses the blue laser beam of short wavelength and an optical system having a large numerical aperture, achieves unprecedentedly high recording density and is expected to proliferate. In the meantime there are needs for a compact and inexpensive optical disk device of BD specification, which is a high-density optical disk that can record/reproduce data stored in a DVD or a CD, for the purpose of preserving and utilizing the information properties stored in the old disks. For this purpose, an optical pickup that can record/reproduce information with three wavelengths on/from optical disks having protective layers of different thicknesses with a single objective lens has been developed. With this optical pickup, spherical aberration due to the difference in thickness of the protective layer is compensated for mainly by means of a hologram and the aperture is restricted by using an optical filter or a diffraction element.

There have been disclosed constitutions for recording/reproducing information on/from optical disks of different types by restricting the aperture for light beams of different wavelengths. This constitution will be described with reference to FIG. 17 that schematically shows the constitution of an example of the optical pickup of the prior art. In FIG. 17, a light beam 61 having a wavelength of 405 nm emitted by a blue laser 60 is collimated by a collimator lens 62 and passes through a polarization beam splitter 63 and a dichroic prism 64, and is reflected on a mirror 65. The reflected beam is then circularly polarized by a quarter wavelength plate 66, passes through a wavelength selective aperture 67 and is focused by an objective lens 68 with a numerical aperture of NA1 on an optical disk 51 having a protective layer 0.1 mm in thickness.

Reflected light from the optical disk 51 passes through the objective lens 68, the wavelength selective aperture 67 and the quarter wavelength plate 66 so as to be linearly polarized perpendicular to that in the outward path, and is reflected by the polarization beam splitter 63. The reflected light is focused by a detector lens 69 so as to enter a light receiving surface of a photodetector 71. Output of the photodetector 71 is processed to obtain information signals and control signals.

A hologram unit 72 is constituted from a red laser 72a, an infrared laser 72b, a hologram 72c and light receiving elements 72d, 72e which are integrated into the unit. A light beam 73 emitted by the red laser 72a is collimated by the collimator lens 74, and is reflected by the dichroic prism 64 and the mirror 65. The reflected beam is then circularly polarized by the quarter wavelength plate 66, passes through the wavelength selective aperture 67 being subjected to aperture restriction and is focused by the objective lens 68 with a numerical aperture of NA2 on an optical disk 52 having a protective layer 0.6 mm in thickness. Reflected light from the optical disk 52 passes through the objective lens 68, the wavelength selective aperture 67 and the quarter wavelength plate 66 so as to be linearly polarized perpendicular to that in the outward path, and is reflected by the dichroic prism 64. The reflected light is focused by the collimator lens 74, diffracted by the hologram 72c and enters the light receiving element 72d. Output of the light receiving element 72d is processed to obtain information signals and control signals.

A light beam 75 emitted by the infrared laser 72b is collimated by the collimator lens 74, and is reflected by the dichroic prism 64 and the mirror 65. The reflected beam is then circularly polarized by the quarter wavelength plate 66, passes through the wavelength selective aperture 67 being subjected to aperture restriction and is focused by the objective lens 68 with a numerical aperture of NA3 on an optical disk 53 having a protective layer 1.2 mm in thickness. Reflected light from the optical disk 53 passes through the objective lens 68, the wavelength selective aperture 67 and the quarter wavelength plate 66 so as to be linearly polarized perpendicular to that in the outward path, and is reflected by the dichroic prism 64. The reflected light is focused by the collimator lens 74, diffracted by the hologram 72c and enters the light receiving element 72e. Output of the light receiving element 72e is processed to obtain information signals and control signals.

Spherical aberration due to the difference in thickness of the protective layer between the disks is compensated for by spherical aberration compensating means (not shown).

The wavelength selective aperture 67 is shown in FIG. 18. In FIG. 18, a central area 67a of the wavelength selective aperture 67 is a region corresponding to the numerical aperture NA3, where a multi-layer optical film is formed that transmits the light beams 61, 73 and 75. An annular area 67b is a region corresponding to a numerical aperture ranging from NA3 to NA2, where a multi-layer optical film is formed that transmits the light beam 61 and the light beam 73 and reflects the light beam 75. A peripheral area 67c is a region having a numerical aperture larger than NA2, and has a multi-layer optical film formed therein that transmits the light beam 61 and reflects the light beam 73 and the light beam 75. As a result, the light beam 75 is focused with the numerical aperture NA3 on the optical disk 53, and the light beam 73 is focused with the numerical aperture NA2 on the optical disk 52. It is necessary to form the multi-layer optical film in the central area 67a so as to match the phases of the light beams 61, 73 that transmit therethrough and the phases of the light beams 61, 73 that transmit through the annular area 67b and the peripheral area 67c (for example, Japanese Unexamined Patent Publication (Kokai) No. 2003-255221 (pp. 12-13, FIG. 10)).

A second example of the prior art has such a constitution of an optical pickup that restricts the aperture by using a diffraction element. This constitution will be described with reference to FIG. 19, which shows the schematic constitution of an example of an optical pickup of the prior art. A light beam 81 having a wavelength of 405 nm emitted by a blue laser 80 is collimated by a collimator lens 82, passes through a polarization beam splitter 83, a beam expander 84, a polarization beam splitter 85 and a diffraction optical element 86, and is focused by an objective lens 87 with a numerical aperture of NA1 on the optical disk 51 having a protective layer 0.1 mm in thickness. Reflected light from the optical disk 51 passes again through the objective lens 87, the diffraction optical element 86, the polarization beam splitter 85 and the beam expander 84, and is reflected by the polarization beam splitter 83. The reflected light is astigmatized by a detector lens 88 and is focused on the light receiving surface of a photodetector 89. Output of the photodetector 89 is processed to obtain information signals and control signals.

A light beam 91 having a wavelength of 655 nm emitted by a red laser 90 passes through polarization beam splitters 92, 93, is collimated by a collimator lens 94, and is reflected by the polarization beam splitter 85. The reflected light beam, of which the diameter is restricted by the diffraction optical element 86, is focused by an objective lens 87 with a numerical aperture of NA2 on the optical disk 52 having a protective layer 0.6 mm in thickness. Reflected light from the optical disk 52 passes again through the objective lens 87 and the diffraction optical element 86, and is reflected by the polarization beam splitter 85. The reflected light is focused by the collimator lens 94, reflected by the polarization beam splitter 85, astigmatized by a detector lens 95 and is focused on the light receiving surface of a photodetector 96. Output of the photodetector 96 is processed to obtain information signals and control signals.

A light beam 98 having a wavelength of 780 nm emitted by an infrared laser 97 is reflected by the polarization beam splitter 92, passes through the polarization beam splitter 93, collimated by the collimator lens 94 to become a parallel beam, and is reflected by the polarization beam splitter 85. The reflected beam, of which the diameter is restricted by the diffraction optical element 86, is focused by an objective lens 87 with a numerical aperture of NA3 on the optical disk 53 having a protective layer 1.2 mm in thickness. Reflected light from the optical disk 53 passes again through the objective lens 87 and the diffraction optical element 86, and is reflected by the polarization beam splitter 85. The reflected light is focused by the collimator lens 94, reflected by the polarization beam splitter 93, astigmatized by the detector lens 95 and is focused on the light receiving surface of the photodetector 96. Output of the photodetector 96 is processed to obtain information signals and control signals.

Spherical aberration due to the difference in thickness of the protective layer between the disks is compensated for by a hologram provided separately.

The diffraction optical element 86 is shown in FIG. 20A and FIG. 20B. In FIG. 20A, the diffraction optical element 86 comprises an area 861 that does not have a diffraction structure in a range corresponding to the numerical aperture of NA3, an area 862 that has a diffraction structure 86a in a range corresponding to a numerical aperture from NA3 to NA2, and an area 863 that has a diffraction structure 86b formed on the outside within a range corresponding to the numerical aperture NA2, the diffraction structures being formed as a stepwise structure as shown in FIG. 20B. The diffraction structure 86a is formed such that difference in optical path length approximately equal to integer times the wavelengths $\lambda 1$ and $\lambda 2$ is generated by one step of the stepwise structure, so that the light beams 81, 91 are transmitted without being diffracted while the light beam 98 is diffracted to become unnecessary light. The diffraction structure 86b is formed such that difference in optical path length approximately equal to integer times the wavelength $\lambda 1$ is generated by one step of the stepwise structure, so that the light beam 81 is transmitted without being diffracted while the light beams 91, 98 are diffracted to become unnecessary light. As a result, the light beam 98 is focused with the numerical aperture NA3 on the optical disk 53, and the light beam 91 is focused with the numerical aperture NA2 on the optical disk 52 (for example, Japanese Unexamined Patent Publication (Kokai) No. 2005-259332 (pp. 20-24, FIGS. 1, 2)).

In the first example of the prior art, since the aperture restriction is applied for a DVD and a CD by the wavelength selective aperture 67, it is necessary to provide multi-layer optical films of three types on one surface. The multi-layer optical film is formed from a dielectric material having a high refractive index, for example, $Ta_2O_5$ that has high transmissivity for blue light and $SiO_2$ having high refractive index, stacked one on another. The multi-layer optical film can be formed by applying a photoresist to a metal film formed by vapor deposition so as to mask portions that would become the annular area 67b and the peripheral area 67c, removing the metal film from the central area 67a by etching, and the multi-layer optical film that transmits the light beam 61, the light beam 73 and the light beam 75 is formed by vapor deposition. Then the metal film and the multi-layer optical film are removed from the annular area 67b and the peripheral area 67c by lift-off, so as to complete the multi-layer optical film for the central area 67a. Then after forming the metal film by vapor deposition, a photoresist is applied to mask the portions of the central area 67a and the peripheral area 67c, the metal film is removed from the annular area 67b by etching, and the multi-layer optical film that transmits the light beam 61 and the light beam 73 and reflects the light beam 75 is formed by vapor deposition. Then the metal film and the multi-layer optical film are removed from the central area 67a and the peripheral area 67c by lift-off, so as to complete the multi-layer optical film for the annular area 67b. Last, the multi-layer optical film that transmits the light beam 61 and reflects the light beam 73 and the light beam 75 is formed by a similar process.

The wavelength selective aperture that employs the multi-layer optical film requires a complicated manufacturing process as described above and high production cost, since the steps of vapor deposition of the metal film, masking, vapor deposition of the multi-layer optical film and lifting off are repeated three times.

In the second example of the prior art, aperture restriction is applied for a DVD and a CD by the diffraction optical element 86. The light beam 98 that passes through the region 862 is diffracted by the diffraction structure 86a so as not to converge on the information recording surface of the optical disk 53, and the light beams 91, 98 that pass through the region 863 are diffracted by the diffraction structure 86b so as not to converge on the information recording surfaces of the optical disks 52, 53. This structure is capable of restricting the aperture for the light beam that converges on the information recording surface of the optical disk, although there is such a problem that, when the diffracted beam reflecting on the optical disk is diffracted again by the diffraction aperture element 86, it takes the same optical path as that of the light beam that has passed the region 861 and reflected by the optical disk 53, and is received by the photodetector 96. This problem will be described below with reference to FIG. 21.

FIG. 21 is a sectional view of the objective lens 87 and the diffraction optical element 86, showing the propagation of the light beam that converges on the optical disk 53. The light beam 98 that passes the region 862 is diffracted by the diffraction structure 86a and, for example, a +1st order diffracted light takes an optical path as shown in the drawing to reach the optical disk 53 and is reflected by the information recording surface of the optical disk 53. The +1st order diffracted light reflected by the optical disk 53 enters the diffraction structure 86a again so as to be diffracted. A −1st order diffracted light generated during the diffraction of the +1st order diffracted light is transmitted without being diffracted by the region 861, takes the same optical path as that of the light beam reflected by the optical disk 53, and enters the photodetector 96. When the −1st order diffracted light generated in the diffraction structure 86a is reflected by the optical disk 53 and is diffracted again so as to become the +1st order diffracted light, it enters the photodetector 96 similarly. This is not limited to the +1st order diffracted light and the −1st order diffracted light, and a +mth order diffraction beam and a −mth order diffraction beam, where m is an integer, similarly take the same optical path as that of the light beam that has transmitted the region 861, and enter the photodetector 96. This applies also to the light beams 91, 98 that are diffracted by the diffraction structure 86b. This means that, although the aperture can be restricted for the outward path, the aperture cannot be restricted for the return path, resulting in unnecessary light being superimposed on the reproduction signal and/or the control signal, thus deteriorating the quality of the signals.

The diffraction structures 86a, 86b, that are formed as a stepwise structure as shown in FIG. 20B, have the effect of decreasing the intensity of the diffracted light beam as it enters the photodetector by increasing the intensity of a particular diffraction beam, although the diffraction structure cannot be formed as a saw-tooth shape and the diffracted beam incident on the photodetector 96 cannot be avoided. Forming the diffraction structures as a stepwise structure also results in deeper grooves which increase the transmission loss due to configuration error and the diffraction loss.

DISCLOSURE OF THE INVENTION

The present invention aims at providing means for restricting aperture that solves the problems of the prior art described above. An object of the present invention is to provide an optical pickup, an optical disk device, a computer and an optical disk recorder that are capable of recording information on and reproducing information from optical disks of different types by using a single objective lens, and enable stable recording/reproduction of information at a low cost.

In order to achieve the object described above, the optical pickup according to a first preferable constitution of the present invention comprises a first light source that emits light of wavelength $\lambda 1$; a second light source that emits light of wavelength $\lambda 2$; a third light source that emits light of wavelength $\lambda 3$; an objective lens that focuses the light of wavelength $\lambda 1$ onto a first optical disk having a protective layer of thickness t1, focuses the light of wavelength $\lambda 2$ onto a second optical disk having a protective layer of thickness t2 and focuses the light of wavelength $\lambda 3$ onto a third optical disk having a protective layer of thickness t3; a photodetector that detects light reflected by the optical disk; and a diffraction aperture element that transmits or diffracts the light emitted by the light sources and the light reflected by the optical disk, wherein the diffraction aperture element has a first diffraction region of annular configuration whose an inner radius is R1 and an outer radius is R2 (R2>R1) or more with respect to an optical axis as a center and a second diffraction region of annular configuration whose an inner radius is R2 with respect to the optical axis as the center, the first diffraction region being constituted such that the light of wavelength $\lambda 1$ and the light of wavelength $\lambda 2$ are transmitted and the light of wavelength $\lambda 3$ is diffracted asymmetrically with respect to the optical axis, and the second diffraction region being constituted such that the light of wavelength $\lambda 1$ is transmitted and the light of wavelength $\lambda 2$ is diffracted asymmetrically with respect to the optical axis.

The present invention provides the optical pickup that records/reproduces information on/from a BD, a DVD and a CD with a single objective lens, having such a constitution as sufficient effect of aperture restriction is achieved for the light of different wavelengths according to the different types of optical disks by means of the diffraction aperture element without using an optical filter based on a multi-layer optical film. The diffraction aperture element can be mass produced at a low cost by an injection molding process, making it possible to provide a compatible head for recording/reproducing information on/from different types of optical disks at a low cost. As a result, the present invention contributes to the proliferation of the high-density optical disk of the new generation.

BRIEF DESCRIPTION OF THE DRAWINGS

FIG. 21 shows the propagation of light diffracted by the diffraction optical element of an optical pickup of the prior art.

BEST MODE FOR CARRYING OUT THE INVENTION

Embodiments of the present invention will be described with reference to the accompanying drawings.

First Embodiment

Figure 1:
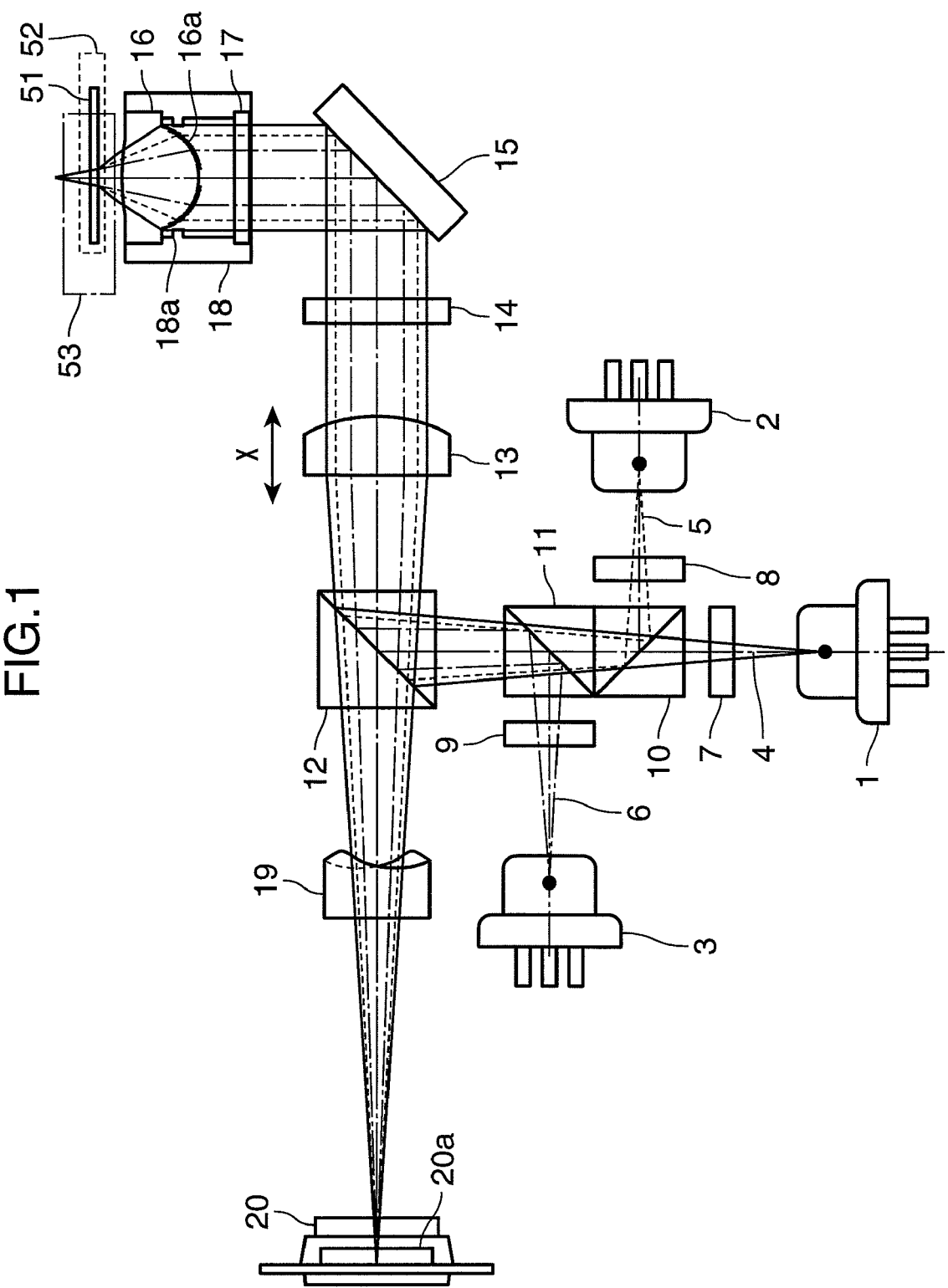
FIG. 1 shows the basic constitution of an optical pickup and propagation of light according to a first embodiment of the present invention.

FIG. 1 shows the constitution of an optical pickup according to the first embodiment of the present invention. In FIG. 1, the optical pickup comprises a blue laser 1, a red laser 2, an infrared laser 3, diffraction gratings 7, 8, 9, dichroic prisms 10, 11, a beam splitter 12, a collimator lens 13, a wavelength plate 14, a mirror 15, an objective lens 16, a diffraction aperture element 17, a lens barrel 18, a detector lens 19 and a photodetector 20.

The blue laser 1 emits light of wavelength $\lambda 1$ (approximately 405 nm). The red laser 2 emits light of wavelength $\lambda 2$ (approximately 655 nm). The infrared laser 3 emits light of wavelength $\lambda 3$ (approximately 780 nm). The optical disk 51 is an optical information medium such as a BD optical disk, having a protective layer of thickness t1 being about 0.075 mm or about 0.1 mm, of which information is recorded/reproduced by means of a light beam of wavelength $\lambda 1$. The optical disk 52 is an optical information medium such as a DVD optical disk, having a protective layer of thickness t2 being about 0.6 mm, of which information is recorded/reproduced by means of a light beam of wavelength $\lambda 2$. The optical disk 53 is an optical information medium such as a CD optical disk, having a protective layer of thickness t3 being about 1.2 mm, of which information is recorded/reproduced by means of a light beam of wavelength $\lambda 3$. In FIG. 1, the optical disk 51 is indicated by a solid line, the optical disk 52 is indicated by a dashed line and the optical disk 53 is indicated by an alternate dot and dash line, where only the protective layer between the surface whereon the light beam strikes and the information recording surface is shown. The optical disks 51, 52, 53 actually have such a constitution as a substrate is laminated thereon so as to maintain necessary mechanical strength and make the thickness 1.2 mm, the same as that of a CD. The optical disk 52 is made by laminating a substrate 0.6 mm thick, while the optical disk 51 is made by laminating a substrate 1.1 mm thick. In the drawings accompanying this specification, the substrates are omitted for the sake of simplicity. The objective lens 16 focuses light on the optical disks 51, 52, 53. The objective lens 16 has a hologram 16a formed on the surface thereof. Wavelength dependency of diffracted light caused by the hologram 16a is utilized to compensate for the spherical aberration due to the difference in thickness of the protective layer between the optical disks 51, 52, 53. The operation of the optical pickup having such a constitution will now be described.

To record/reproduce information on/from the optical disk 51 that has high recording density, a light beam 4 of wavelength $\lambda 1$ emitted by the blue laser 1 is separated into a main beam and two sub-beams by the diffraction grating 7, and passes through the dichroic prisms 10, 11 to enter the beam splitter 12. The dichroic prism 10 is designed so as to transmit the light of wavelength $\lambda 1$ and reflect the light of wavelength $\lambda 2$, while the dichroic prism 11 is designed so as to transmit the light of wavelengths $\lambda 1$ and $\lambda 2$ and reflect the light of wavelength $\lambda 3$. The beam splitter 12 is an optical path branching element having such a polarization splitting characteristic that reflects a linearly polarized component having polarization plane parallel to the incident surface (hereinafter referred to as S-polarized light) and transmits linearly polarized component having polarization plane perpendicular to the former (hereinafter referred to as P-polarized light) for the light of wavelengths $\lambda 1$ and $\lambda 2$, reflects a part of S-polarized light and transmits a part of S-polarized light for the light of wavelength $\lambda 3$. The light beam 4 emitted by the blue laser 1 is configured to enter the beam splitter 12 in the form of S polarization, so as to be reflected by the beam splitter 12, collimated by the collimator lens 13 and transformed by the wavelength plate 14 from linear polarization into circular polarization. The collimator lens 13 is movable in the direction indicated by arrow X, so that the collimator lens 13 is moved away from the light source when thickness t1 of the protective layer of the optical disk 51 is 0.075 mm, and the collimator lens 13 is moved nearer to the light source when thickness t1 of the protective layer of the optical disk 51 is 0.1 mm, thereby placing the disk at a position less influenced by the spherical aberration and dealing with the 2-layer structure of the optical disk 51. The wavelength plate 14 is designed so as to behave as a quarter wavelength plate for the light of wavelengths $\lambda 1$ and $\lambda 2$, but not for the light of wavelength $\lambda 3$. The light beam 4 is reflected by the mirror 15, passes through the diffraction aperture element 17, is subjected to aperture restriction by the aperture 18a provided in the lens barrel 18 with a numerical aperture NA1 and enters the objective lens 16. The light beam 4 is then diffracted by the hologram 16a formed on the surface of the objective lens 16, refracted by the objective lens 16, passes the protective layer of thickness t1 and is focused on the information recording surface of the optical disk 51 with a numerical aperture NA1. The light beam 4 reflected by the information recording surface of the optical disk 51 is circularly polarized in the direction opposite to that in the outward path, traces back the optical path, passes the objective lens 16 and the diffraction aperture element 17, is transformed into P polarization by the wavelength plate 14, is focused by the collimator lens 13 and passes through the beam splitter 12. The light beam 4 that has been turned into a convergent beam is astigmatized by the detector lens 19 and enters the photodetector 20 so as to be converted into electrical signals by a light receiving element 20a. The detector lens 19 is a cylindrical lens that performs lens operation in a direction inclined by 45 degrees from the incident surface of the beam splitter 12. As the light beam 4 is astigmatized, a focusing signal can be obtained by an astigmatization method, so that a tracking signal can be generated by a differential push-pull method (hereinafter referred to as DPP) by using the main beam and the two sub-beams generated by the diffraction grating 7. Information signals can also be generated from the output of the photodetector 20.

To record/reproduce information on/from the optical disk 52, a light beam 5 of wavelength λ2 emitted by the red laser 2 is separated into a main beam and two sub-beams by the diffraction grating 8, reflected by the dichroic prisms 10, passes through the dichroic prism 11 to enter the beam splitter 12. The light beam 5 emitted by the red laser 2 is configured to enter the beam splitter 12 in the form of S polarization, so as to be reflected by the beam splitter 12, is collimated by the collimator lens 13 and is transformed by the wavelength plate 14 from linear polarization into circular polarization. The light beam 5 is then reflected by the mirror 15, subjected to aperture restriction by the diffraction aperture element 17 and enters the objective lens 16. The light beam 5 is then diffracted by the hologram 16a formed on the surface of the objective lens 16, refracted by the objective lens 16, passes the protective layer of thickness t2 and is focused by the refraction in the objective lens 16 on the information recording surface of the optical disk 52 with a numerical aperture NA2. The light beam 5 reflected by the information recording surface of the optical disk 52 is circularly polarized in the direction opposite to that in the outward path, traces back the optical path, passes the objective lens 16 and the diffraction aperture element 17, is transformed into P polarization by the wavelength plate 14, is focused by the collimator lens 13 and passes through the beam splitter 12. The light beam 5 that has been turned into a convergent beam is astigmatized by the detector lens 19 and enters the photodetector 20 so as to be converted into electrical signals by a light receiving element 20a. A focusing signal, a tracking signal and information signals are obtained by processing the output of the photodetector 20, similarly to that described previously.

To record/reproduce information on/from the optical disk 53, a light beam 6 of wavelength λ3 emitted by the infrared laser 3 is separated into a main beam and two sub beams by the diffraction grating 9, reflected by the dichroic prism 11 and enters the beam splitter 12. The light beam 6 emitted by the infrared laser 3 is configured to enter the beam splitter 12 in the form of S polarization, so that a part of the S-polarized light is reflected by the beam splitter 12 and is collimated by the collimator lens 13. The light beam 6 further passes the wavelength plate 14, is reflected by the mirror 15, is subjected to aperture restriction by the diffraction aperture element 17 and enters the objective lens 16. The light beam 6 is then diffracted by the hologram 16a, refracted by the objective lens 16, passes the protective layer of thickness t3 and is focused on the information recording surface of the optical disk 53 with a numerical aperture NA3. The light beam 6 reflected by the information recording surface of the optical disk 53 traces back the same optical path, passes the objective lens 16, the diffraction aperture element 17 and the wavelength plate 14, is focused by the collimator lens 13 and enters the beam splitter 12 in the form of S polarization. A part of the S-polarized light of the light beam 6 transmits the beam splitter, is astigmatized by the detector lens 19 and enters the photodetector 20 so as to be converted into electrical signals by the light receiving element 20a. A focusing signal, a tracking signal and information signals are obtained by processing the output of the photodetector 20. Optical disks of CD specifications include ones having a high birefringent effect which may disable the light to reach the photodetector 20 when the optical path is branched by polarization separation as in the case of the light beams 4 and 5. For this reason, it is desirable to branch the optical path in such a way as a predetermined amount of light is reflected and a predetermined amount of light is transmitted regardless of the direction of polarization. The lens barrel 18 that holds the objective lens 16 is controlled in accordance to the focusing signal so as to follow the fluctuation of surface of the optical disks 51, 52, 53 by means of the focusing signal and follow the track formed on the optical disks 51, 52, 53 by means of the tracking signal.

Figure 2:
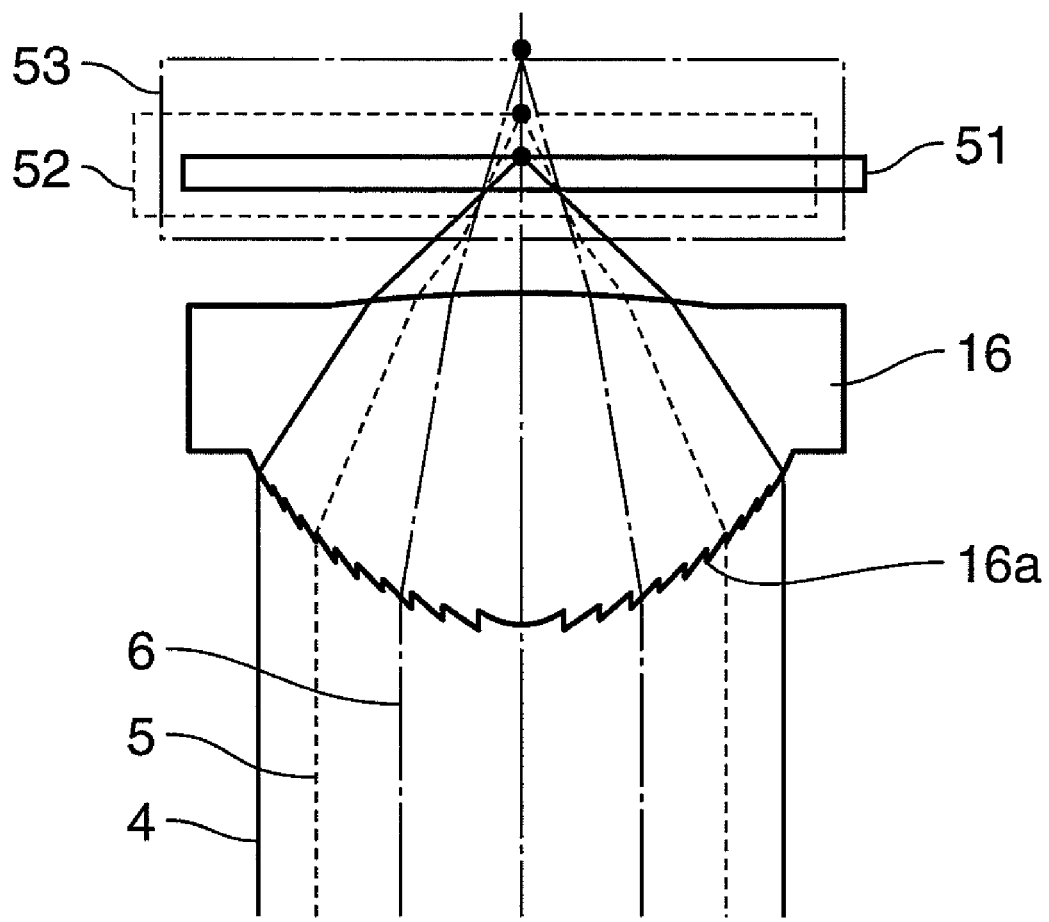
FIG. 2 is a sectional view of an objective lens according to the first embodiment of the present invention.

FIG. 2 is a sectional view of the objective lens 16, showing the propagation of the light beams focused on the optical disks 51, 52, 53. The hologram 16a is a diffraction grating having saw-tooth configuration formed in concentric circles on the surface of the objective lens 16, designed so as to generate a +1st order diffracted light with the highest intensity from the light beams 4, 5, 6. Wavelength dependency of the +1st order diffracted light is utilized to compensate for the spherical aberration caused by the difference in thickness of the protective layer between the optical disks 51, 52, 53. The +1st order diffracted light of the light beam 4 is refracted by the objective lens 16, passes through the protective layer of thickness t1 and forms a satisfactory spot on the information recording surface of the optical disk 51. The +1st order diffracted light of the light beam 5 is refracted by the objective lens 16, passes through the protective layer of thickness t2 and forms a satisfactory spot on the information recording surface of the optical disk 52. The +1st order diffracted light of the light beam 6 is refracted by the objective lens 16, passes through the protective layer of thickness t3 and forms a satisfactory spot on the information recording surface of the optical disk 53. For the compensation of the spherical aberration, diffracted light beams other than the +1st order diffracted light from the hologram may also be used. For example, a +3rd order diffraction light may be used for the light beam 4 of wavelength λ1, and a +2nd order diffraction light may be used for the light beams 5, 6.

Figure 3:
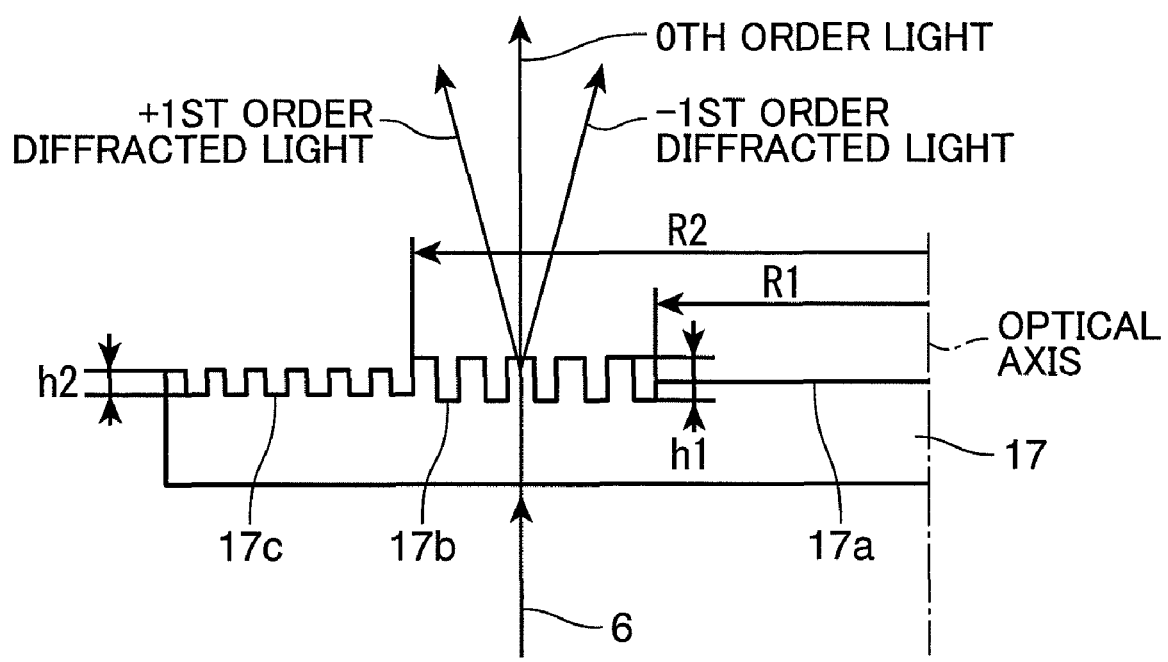
FIG. 3 is a sectional view of a diffraction aperture element according to the first embodiment of the present invention, showing a portion from the optical axis to one end in an enlarged view.

The functions and the constitution of the diffraction aperture element 17 will be described below with reference to FIG. 3 through FIG. 10. FIG. 3 is a sectional view of the diffraction aperture element 17 showing the portion from the optical axis to one end in an enlarged view. In the diffraction aperture element 17 shown in FIG. 3, the light beam of wavelength λ3 passing radius R1 is focused with the numerical aperture NA3 on the optical disk 53, and the light beam of wavelength λ2 passing radius R2 is focused with the numerical aperture NA2 on the optical disk 52. The circle of radius R1 is a plain region 17a without diffraction grating, the area between the circles of radii R1 and R2 is a first diffraction region 17b, and the area outside of the circle of radius R2 is a second diffraction region 17c. The first diffraction region 17b is an annular region having the inner radius R1 and the outer radius R2 with respect to the optical axis as the center, and the second diffraction region 17c is an annular region having the inner radius R2 with respect to the optical axis as the center. The diffraction gratings of the first and second diffraction regions 17b, 17c are constituted from grooves having rectangular cross sections h1 and h2 in depth, respectively. Diffracted beams are denoted as +1st order, +2nd order, +3rd order and so on, from that of smaller diffraction angle to larger diffraction angle, and −1st order, −2nd order, −3rd order and so in a symmetrical configuration on the opposite side. The difference L in optical path length generated by the presence of a stepwise structure in the diffraction grating when the light beam passes through the diffraction region is given as the product of the depth h of the diffraction grating and the difference in the refractive index (n−1) between the medium and air as follows, where n is the refraction index for light of wavelength λ.

$$L = h \times (n-1)$$

Assuming that the difference L in optical path length is k times the wavelength λ, then the following equation holds:

$$k\lambda = h \times (n-1) \quad (1)$$

Figure 4:
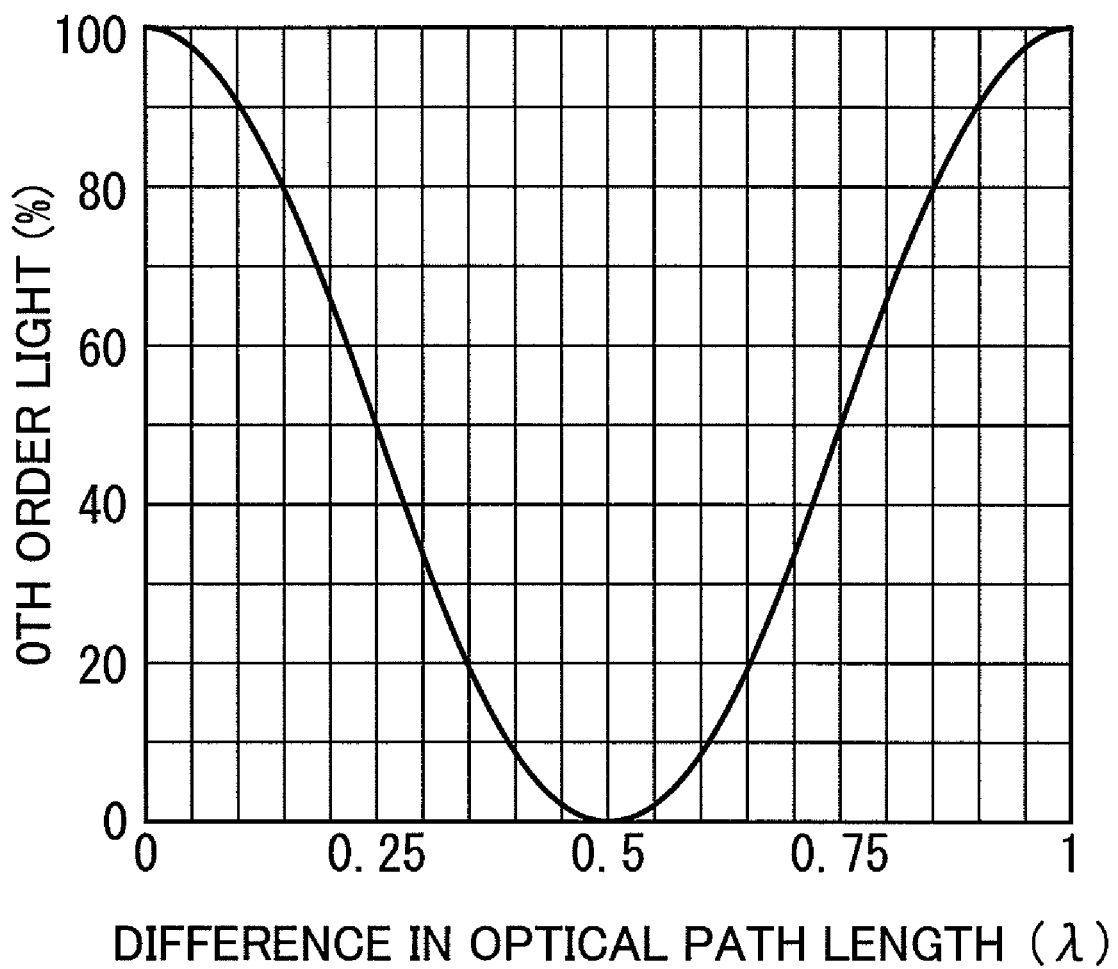
FIG. 4 shows the relationship between the difference in optical path length and 0th order light according to the first embodiment of the present invention.

The relationship between the difference L in optical path length and the 0th order light (light beam transmitted without being diffracted) is shown in FIG. 4. In FIG. 4, proportion of the 0th order light calculated as scalar is plotted against the abscissa which is the difference L in optical path length given in the unit of wavelengths, ranging from 0 wavelengths to one wavelength. 100% 0th order light means that the light is totally transmitted without diffraction, and 0% means that the light is totally diffracted. Since the proportion of the 0th order light at a wavefront of a phase that is one full wavelength shifted is the same as that of 0 wavelengths, the pattern of change in the proportion of the 0th order light in a range from 0 wavelengths to one wavelength is repeated. Accordingly, the proportion of the 0th order light for any difference L in optical path length can be determined from the proportion of the 0th order light for the difference in optical path length in a range from 0 wavelengths to one wavelength. As a result, the light beam 4 of wavelength λ1 and the light beam 5 of wavelength λ2 can be transmitted and the light beam 6 having wavelength λ3 can be diffracted, setting the numerical aperture NA3 for the light beam 6, by setting the difference L in optical path length that occurs when the light beam passes through the first diffraction region 17b to integer times the wavelengths λ1 and λ2 and integer times the wavelengths λ3 plus a half wavelength. For example, when borosilicate crown glass (BK7) is used to form the diffraction aperture element 12 and a depth h1 of the grating of the first diffraction region 17b is set to 3.82 μm, a refraction index n of BK7 for light having a wavelength λ of 405 nm is 1.5302, and therefore the value of k given by equation (1) is 5.00 and the difference L in optical path length which the light beam 4 undergoes is five wavelengths. Thus the proportion of the 0th order light is the same as that at 0 wavelengths, which means that nearly 100% of the light beam 4 of wavelength λ1 is transmitted. The refraction index n of BK7 for light having a wavelength λ of 655 nm is 1.5144, and therefore the value of k given by equation (1) is 3.00 and the difference L in optical path length which the light beam 5 undergoes is three wavelengths. Thus the proportion of 0th order light is the same as that at 0 wavelengths, which means that nearly 100% of the light beam 5 of wavelength λ2 is transmitted. In contrast, the refraction index n of BK7 for light having a wavelength λ of 780 nm is 1.5112, and therefore the value of k given by equation (1) is 2.50 and the difference L in optical path length which the light beam 5 undergoes is 2.5 wavelengths. Thus the proportion of the 0th order light is the same as that at 0.5 wavelengths, which means that nearly 100% of the light beam 6 of wavelength λ3 is diffracted and the 0th order light is not transmitted, thus successively restricting the aperture.

The light beam 4 of wavelength λ1 can be transmitted while the light beam 5 of wavelength λ2 and the light beam 6 of wavelength λ3 can be diffracted, by setting the difference L in optical path length that occurs when the light beam passes through the second diffraction region 17c to integer times the wavelengths λ and integer times the wavelengths λ2 and λ3 plus a half wavelength. Diffracting the light beam 5 enables it to set the numerical aperture to NA2, and diffracting the light beam 6 enables it to restrict the aperture also in this region. For example, when a depth h2 of the grating of the second diffraction region 17c is set to 0.70 μm, the value of k given by equation (1) is 0.92 when the wavelength λ is 405 nm and the difference L in optical path length which the light beam 4 undergoes is 0.92 wavelengths. Thus approximately 95% of the light beam 4 of wavelength λ1 is transmitted. When the wavelength λ is 655 nm, the value of k given by equation (1) is 0.55 and the difference L in optical path length which the light beam 5 undergoes is 0.55 wavelengths. Thus approximately 97.5% of the light beam 5 of wavelength λ2 is diffracted, and the numerical aperture can be set to NA2. When the wavelength λ is 780 nm, the value of k given by equation (1) is 0.46 and the difference L in optical path length which the light beam 5 undergoes is 0.46 wavelengths. Thus approximately 98% of the light beam 6 of wavelength λ3 of 780 nm is diffracted, enabling it to restrict the aperture similarly to the case of wavelength λ2. In the second diffraction region 17c, it is not possible to diffract 100% of the light beam 5 of wavelength λ2 and the light beam 6 of wavelength λ3 at the same time, and therefore 2 to 3% of the light is transmitted as the 0th order light, although this is hardly a problem in practice. The proportion of the 0th order light that transmits through the first and second diffraction regions 17b, 17c may be within roughly ±10%. The 0th order light having the proportion of ±10% is reflected by the optical disk 51, 52 or 53 and is reduced to ±1% as it passes through the first and second diffraction regions 17b, 17c, which is permissible if received by the photodetector 20. From FIG. 3, it can be seen that the proportion of the 0th order light that transmits the diffraction regions becomes ±10% when the difference in optical path length is (k±0.1) λ.

The depth of the diffraction grating of the second diffraction region 17c may also be set such that only the light beam 5 is diffracted nearly 100%, and the 0th order light of the light beam 6 generated thereby is subjected to aperture restriction by spherical aberration. When the numerical aperture becomes larger, it becomes difficult to compensate for the spherical aberration for the light beam 6 of wavelength λ3 by means of the hologram 16a formed on the surface of the objective lens 16. Accordingly, the light beam 6 that passes through a region having a numerical aperture of NA2 or higher cannot be focused at the same position as that of the light beam 6 that has passed through the numerical aperture NA3. The reflected beam from the optical disk 53 also does not return to the same optical path as that of the light beam 6 that passes through the plain region 17a due to the spherical aberration, and becomes divergent.

Aperture restriction for the light beam 6 by spherical aberration may also be intentionally made use of, by setting the difference L in optical path length to integer times the wavelength λ1 and integer times the wavelength λ2 plus a half wavelength in the second diffraction region 17c so that the light beam 4 of wavelength λ1 is transmitted and the light beam 5 of wavelength λ2 is diffracted, thereby setting the numerical aperture to NA2 for the light beam 5, thereby applying aperture restriction for the light beam 6 by spherical aberration. For example, when the depth h2 of the grating of the second diffraction region 17c is set to 3.12 μm, the value of k given by equation (1) is 4.08 when the wavelength λ is 405 nm and the difference in the optical path length which the light beam 4 undergoes is 4.08 wavelengths. Thus the proportion is the same as that at 0.08 wavelengths, and approximately 95% of the light beam 4 of wavelength λ1 is transmitted. When the wavelength λ is 655 nm, the value of k given by equation (1) is 2.45 and the difference in optical path length which the light beam 5 undergoes is 2.45 wavelengths. Thus the proportion is the same as that at 0.45 wavelengths, and approximately 97.5% of the light beam 5 of wavelength λ2 is diffracted, and the numerical aperture can be set to NA2. When the depth h2 of the diffraction grating of the second diffraction region 17c is set to 4.52 μm, the difference in the optical path length which the light beam 4 undergoes is 5.91 wavelengths, and approximately 95% of the light beam 4 is transmitted. When the wavelength λ is 655 nm, the difference in the optical path length which the light beam 5 undergoes is 3.55 wavelengths. Thus approximately 97.5% of the light beam 5 is diffracted, and the numerical aperture can be set to NA2. While an example of using BK7 to form the diffraction aperture element 17 has been described above, there is no restriction on the material and molding of a resin is preferably employed for manufacturing a large quantity at a low cost. Mass production with greatly reduced production cost is made possible by employing an injection molding process where a resin that has been heated to melt is injected into a mold under pressure, and is hardened to form the diffraction aperture element 17.

Figure 5:
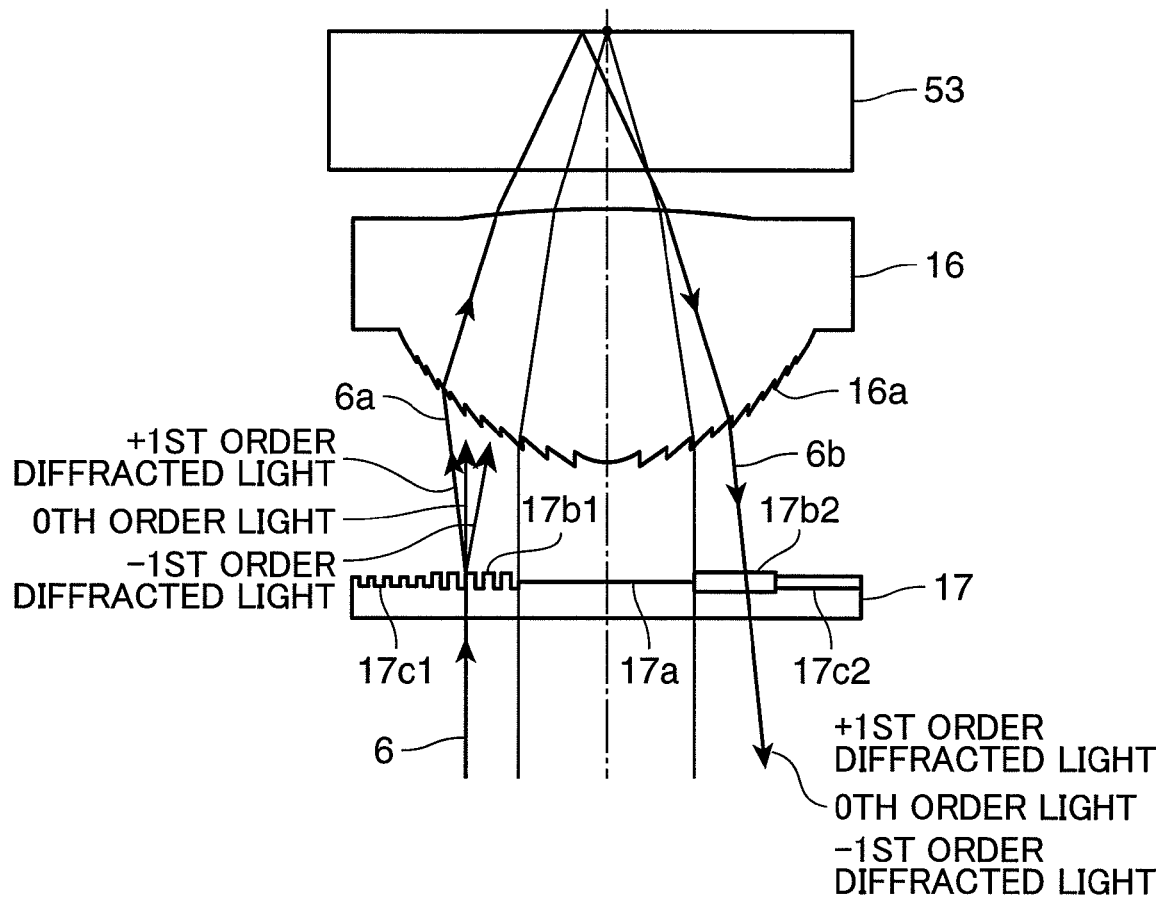
FIG. 5 shows the propagation of light diffracted by a first diffraction region of the diffraction aperture element according to the first embodiment of the present invention.
Figure 6:
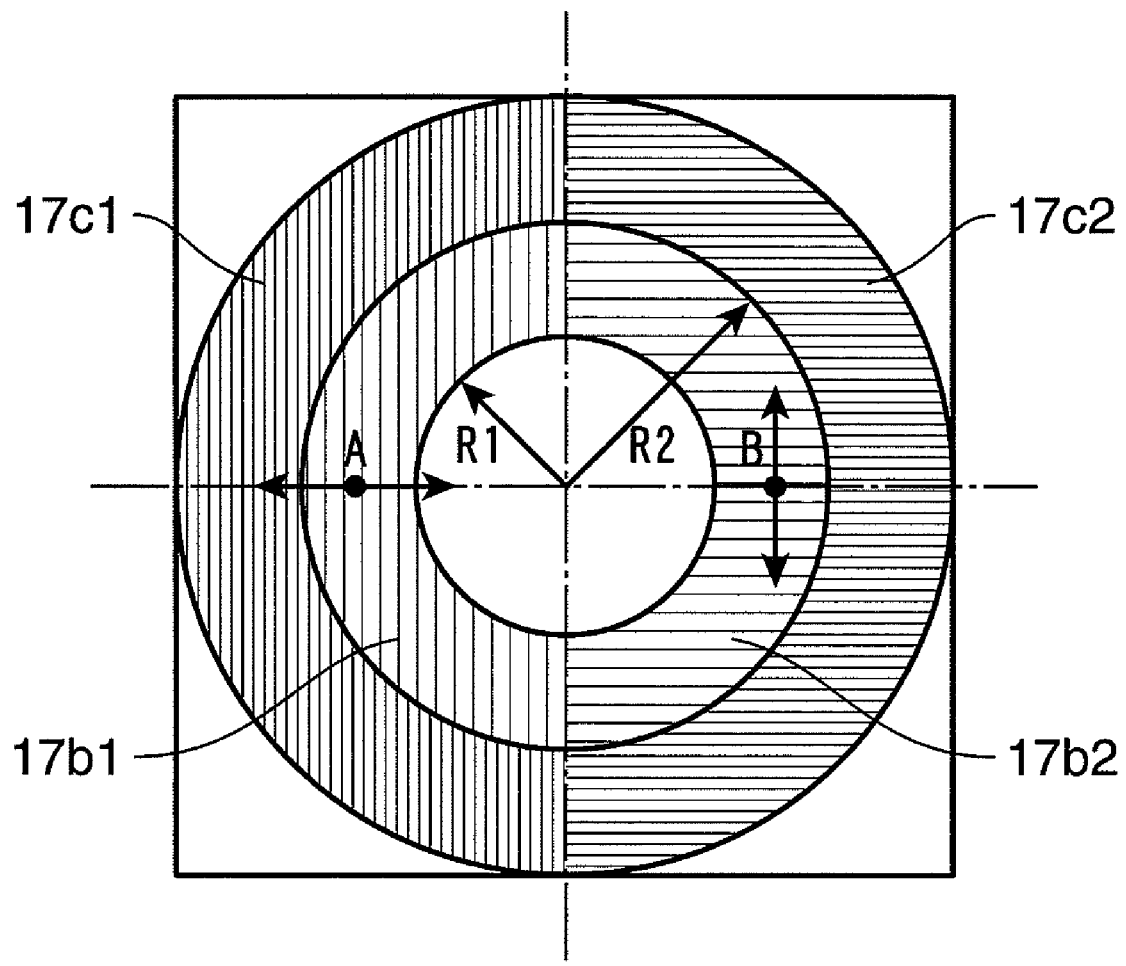
FIG. 6 is a first schematic view showing the diffraction grating pattern of the diffraction aperture element according to the first embodiment of the present invention.
Figure 7:
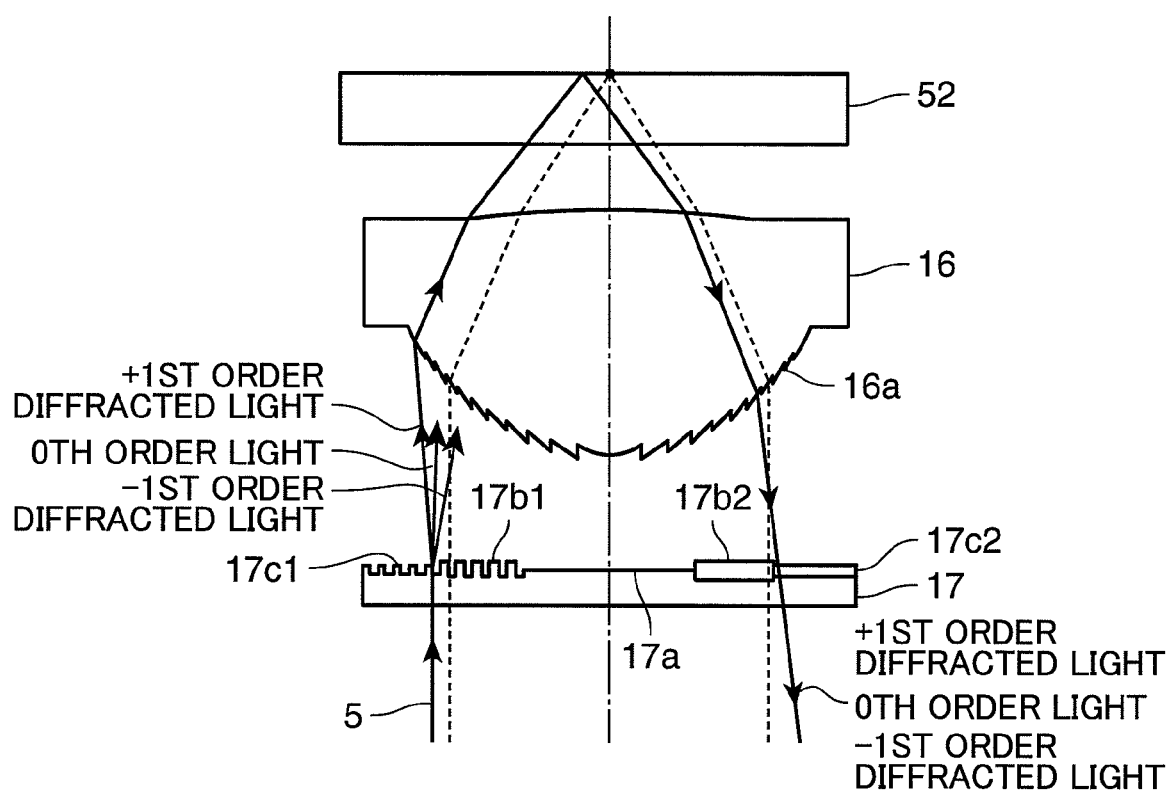
FIG. 7 shows the propagation of light diffracted by a second diffraction region of the diffraction aperture element according to the first embodiment of the present invention.

When the diffraction grating is formed in a configuration symmetrical with respect to the optical axis as in the prior art, the aperture restriction by means of the diffraction aperture element 17 is effective for the light beam in the outward optical path, but is not effective for the reflected beam from the optical disk 51, 52 or 53 which propagates along the same optical path as that of the light beam 6 passing through the plain region 17a, and ends up entering the photodetector 20. In order to solve this problem, the present invention employs such a constitution as the light beam 6 of wavelength λ3 is diffracted asymmetrically with respect to the optical axis in the first diffraction region 17b, while either the light beam 5 of wavelength λ2 and the light beam 6 of wavelength λ3 or only the light beam 5 of wavelength λ2 is diffracted asymmetrically with respect to the optical axis in the second diffraction region 17c. This constitution will now be described with reference to FIG. 5 to FIG. 7. FIG. 5 is a sectional view of the diffraction aperture element 17 and the objective lens 16, showing the propagation of the light beam 6 that is focused on the optical disk 53. FIG. 6 is a front view of the diffraction aperture element 17, and schematically shows the diffraction grating pattern. FIG. 7 is a sectional view of the diffraction aperture element 17 and the objective lens 16, showing the propagation of the light beam 5 that is focused on the optical disk 52.

In FIG. 6, the first diffraction region 17b is divided into two regions 17b1 and 17b2 of which diffraction gratings cross each other at right angles, and the second diffraction region 17c is also divided into two regions 17c1 and 17c2 of which diffraction gratings cross each other at right angles. As a result, the light beam 6 incident on the region 17b1 is diffracted in direction A when viewed from the front of the diffraction aperture element 17 so as to generate diffracted light of a plurality of orders. The light beam 6 incident on the region 17b2 is diffracted in direction B so as to generate diffracted light of a plurality of orders. Among the light generated by diffracting the light beam 6 in direction A, for example, a +1st order diffracted light 6a passes through the objective lens 16 to reach the optical disk 53 and is reflected by the information recording surface of the optical disk 53 to pass the objective lens 16 again, as shown in FIG. 5. A +1st order diffracted light 6b emerging from the objective lens 16 is almost parallel to the +1st order diffracted light 6a that is incident on the objective lens 16. When the +1st order diffracted light 6b enters the region 17b2, it is diffracted in direction B that is perpendicular to the direction of diffraction by the region 17b1, and therefore propagates straight as seen in the sectional view of FIG. 5, without returning to the same optical path as that of the light beam 6 that passes through the plain region 17a. This applies also to the −1st order light, the +mth order light and the −mth order light generated in the region 17b1, which do not return to the same optical path as that of the light beam 6 that passes through the plain region 17a.

The light beam 6 incident on the region 17b2 is diffracted in direction B so as to generate diffracted light of a plurality of orders. The diffracted light passes through the objective lens 16 to be reflected by the optical disk 53 to pass the objective lens 16 again and enter the region 17b1. The diffracted light incident on the region 17b1 is diffracted in direction A and therefore does not return to the same optical path as that of the light beam 6 that passes through the plain region 17a. As a result, the light beam 6 of wavelength λ3 is diffracted nearly 100% in the first diffraction region 17b, while the diffracted light is reflected by the optical disk 53 and is diffracted again in the first diffraction region 17b, although the diffracted light does not enter the photodetector 20a. Thus according to the present invention, aperture restriction is made possible for the light beam 6 both in the outward path and the return path.

In the second diffraction region 17c, the light beam 5 and the light beam 6 incident on the region 17c1 are diffracted in direction A as viewed from the front of the diffraction aperture element 17, similarly as in the first diffraction region 17b, so as to generate diffracted light of a plurality of orders, which is diffracted in direction B in the region 17c2. Among the light generated by diffracting the light beam 5 in direction A, for example, +1st order diffracted light passes through the objective lens 16, is reflected by the optical disk 52 and passes the objective lens 16 again to enter the region 17c2, as shown in FIG. 7. The +1st order diffracted light incident on the region 17c2 is diffracted in direction B, and therefore does not return to the same optical path as that of the light beam 5 that passes through the plain region 17a. This applies also to the −1st order light, the +mth order light and the −mth order light generated in the region 17c1, which do not return to the same optical path as that of the light beam 5 that passes through the plain region 17a.

The light beam 5 incident on the region 17c2 is diffracted in direction B so as to generate diffracted light of a plurality of orders. The diffracted light passes through the objective lens 16 to be reflected by the optical disk 52 to pass the objective lens 16 again and enter the region 17c1. The diffracted light incident on the region 17c1 is diffracted in direction A and therefore does not return to the same optical path as that of the light beam 5 that passes through the plain region 72a. This applies also to the diffracted beam 6 incident on the regions 17c1, 17c2. As a result, the light beam 5 of wavelength λ2 and the light beam 6 of wavelength λ3 are diffracted about 97% in the second diffraction region 17c, while the diffracted light is reflected by the optical disk 53 and is diffracted again in the second diffraction region 17c, although the diffracted light does not enter the light detecting element 20a. Thus aperture restriction is made possible for the light beam 5 and the light beam 6 both in the outward path and the return path. In the case the numerical aperture is NA2 or larger and the light beam 6 is subjected to greater spherical aberration and therefore it is not necessary to apply aperture restriction by the diffraction aperture element 17, the second diffraction region 17c may be constituted such that the numerical aperture becomes NA2 for the light beam 5 only.

Figure 8:
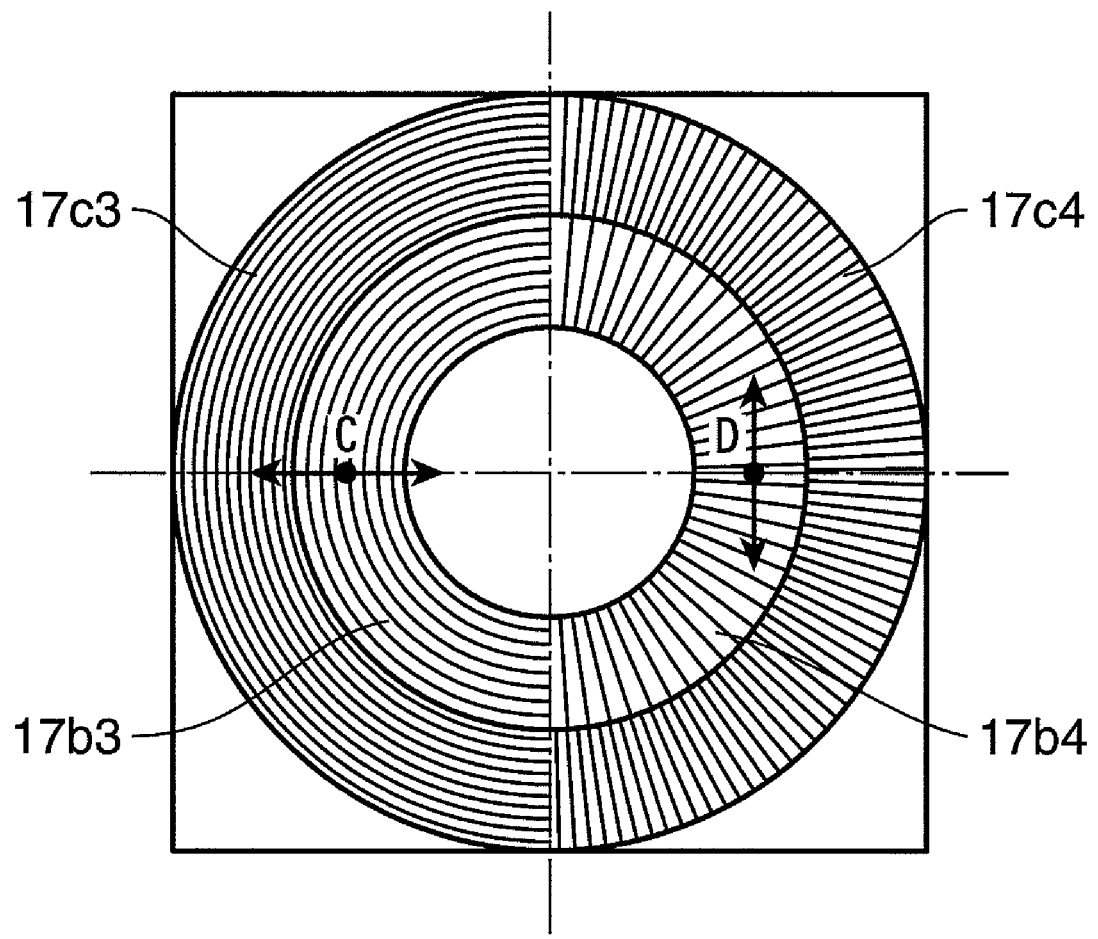
FIG. 8 is a second schematic view showing the diffraction grating pattern of the diffraction aperture element according to the first embodiment of the present invention.
Figure 9:
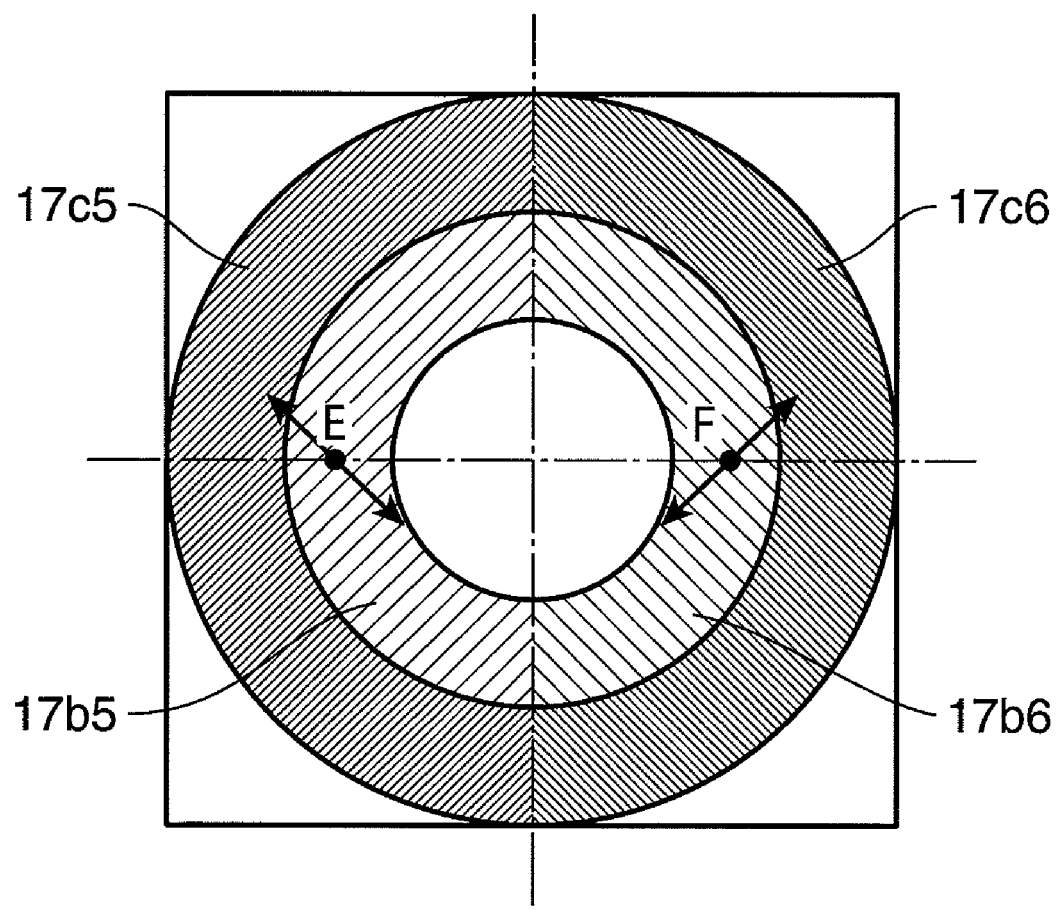
FIG. 9 is a third schematic view showing the diffraction grating pattern of the diffraction aperture element according to the first embodiment of the present invention.

A diffraction grating for diffracting the light beam 5 and the light beam 6 asymmetrically with respect to the optical axis may be constituted as shown in FIG. 8, FIG. 9 and FIG.

Figure 10:
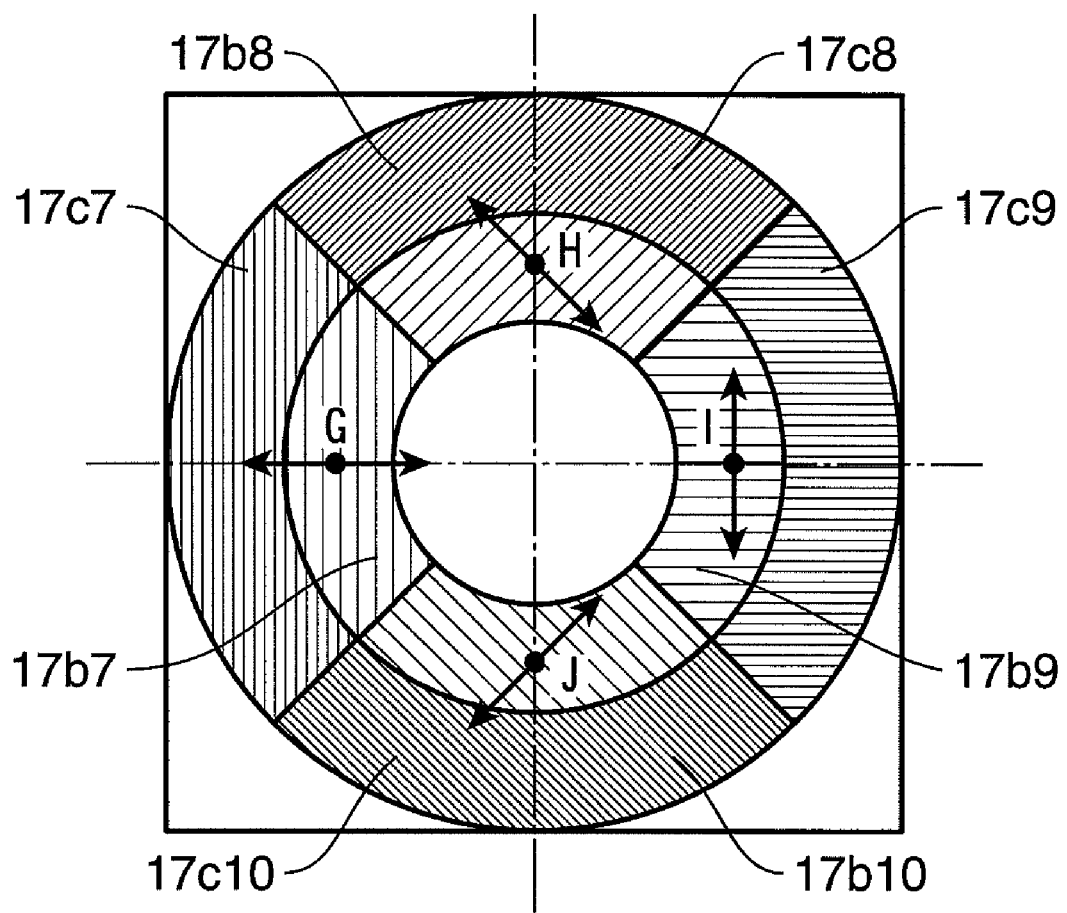
FIG. 10 is a fourth schematic view showing the diffraction grating pattern of the diffraction aperture element according to the first embodiment of the present invention.

10. FIG. 8, FIG. 9 and FIG. 10 are all front views of the diffraction aperture element 17, and schematically show the diffraction grating patterns. In FIG. 8, the first diffraction region 17b is divided into two regions 17b3 and 17b4, the diffraction grating pattern of the region 17b3 running in the circumferential direction and the diffraction grating pattern of the region 17b4 running in the radial direction. Accordingly, the light beam 6 incident on the region 17b3 is diffracted in direction C as viewed from the front of the diffraction aperture element 17, and the diffracted light reflected by the optical disk is diffracted in direction D in the region 17b4, and therefore does not return to the same optical path as that of the light beam 6 that passes through the plain region 17a. As a result, aperture restriction can be applied to the light beam 6 in both the outward path and the return path. Similarly for the second diffraction region 17c, the diffraction grating pattern of the region 17c3 runs in the circumferential direction and the diffraction grating pattern of the region 17c4 runs in the radial direction. Accordingly, the light beams 5 and 6 incident on the region 17c3 are diffracted in direction C while the light beams 5 and 6 incident on the region 17c4 are diffracted in direction D, and therefore do not return to the same optical path as those of the light beams 5 and 6 that pass through the plain region 17a. As a result, aperture restriction can be applied to the light beam 5 and the light beam 6 in both the outward path and the return path.

In FIG. 9, the first diffraction region 17b is divided into two regions 17b5 and 17b6, and the diffraction grating patterns of the regions 17b5 and 17b6 cross each other perpendicularly in an oblique direction as shown in the drawing. The light beam 6 incident on the region 17b5 is diffracted in direction E, and the diffracted light reflected by the optical disk 53 is diffracted in direction F in the region 17b6, and therefore does not return to the same optical path as that of the light beam 6 that passes through the plain region 17a. As a result, aperture restriction can be applied to the light beam 6 in both in the outward path and the return path. Similarly for the second diffraction region 17c, the light beams 5 and 6 incident on the region 17c5 are diffracted in direction E while the light beams 5 and 6 incident on the region 17b6 are diffracted in direction F, and therefore do not return to the same optical path as those of the light beams 5 and 6 that pass through the plain region 17a. As a result, aperture restriction can be applied to the light beam 5 and the light beam 6 in both the outward path and the return path.

In FIG. 10, the first diffraction region 17b is divided into four regions 17b7 through 17b10, and the diffraction grating patterns of regions that oppose each other across the optical axis cross each other perpendicularly, with the directions of diffraction being as indicated by G through J. The light beam 6 incident on the regions 17b7, 17b8 is diffracted in direction G and in direction H, and the diffracted light reflected by the optical disk 53 is diffracted in direction I and direction J in the regions 17b9 and 17b10, respectively, and therefore do not return to the same optical path as that of the light beam 6 that passes through the plain region 17a. As a result, aperture restriction with the numerical aperture NA3 can be applied to the light beam 6 in both the outward path and the return path. Similarly for the second diffraction region 17c, the light beams 5 and 6 diffracted in the regions 17c7 to 17c10 do not return to the same optical paths as those of the light beams 5 and 6 that pass through the plain region 17a. As a result, aperture restriction can be applied to the light beam 5 and the light beam 6 in both the outward path and the return path. Thus, dividing into four regions makes it possible to prevent, for example, a part of light diffracted in the border area between the region 17b1 and the region 17b2 in FIG. 6 from returning to the same optical path as that of the light beam 6 that passes through the plain region 17a. The number of divisions may be increased.

This embodiment has such a constitution as the directions of diffraction are perpendicular to each other on both sides of the optical axis. However, the directions may not necessarily be perpendicular, and may be such that the diffracted light beams do not return to the same optical path as that of the light beam 6 that passes through the plain region 17a. The only requirement is that the directions of diffraction are not symmetrical with respect to the optical axis.

As described above, numerical aperture for the light beams 4, 5, 6 focused on the optical disks 51, 52, 53, respectively, can be set by applying such an aperture restriction as the numerical aperture becomes NA1 for the light beam 4 of wavelength λ1 by means of the aperture 18a of the lens barrel 18, such an aperture restriction that the numerical aperture becomes NA2 for the light beam 5 of wavelength λ2 by means of the second diffraction region 17c of the diffraction aperture element 17, and such an aperture restriction that the numerical aperture becomes NA3 for the light beam 6 of wavelength λ3 by means of the first diffraction region 17b of the diffraction aperture element 17.

While focus detection by means of an astigmatization method has been described above, other methods such as a knife edge method or a spot size detection method may also be employed. Detection of tracking by means of a DPP method has been described above, although another method such as a phase difference method or a push-pull method may also be employed. Moreover, while spherical aberration caused by the difference in thickness of the protective layer between the optical disks 51, 52, 53 is compensated for mainly by means of the diffracted light of the hologram in this embodiment, compensation may also be done by using a combination of lenses, divergence of light or other means.

In this embodiment, the diffraction aperture element 17 is constituted separately from the objective lens 16 and is disposed in the vicinity of the objective lens 16 in the optical path passing the light sources 1, 2, 3 and the objective lens 16, as shown in FIG. 5. However, this embodiment is not restricted to this constitution, and the diffraction aperture element 17 may also be formed on the surface of the objective lens 16.

According to this embodiment, in the optical pickup that records/reproduces information on/from optical disks of different types by using a plurality of light beams of different wavelengths, numerical aperture can be set for the light beams that are focused on the optical disks by using the diffraction aperture element, thereby ensuring satisfactory aperture characteristics. Since the diffraction aperture element can be mass produced by the injection molding method, an optical pickup that is inexpensive and has practical value can be provided.

Second Embodiment 2

Figure 11:
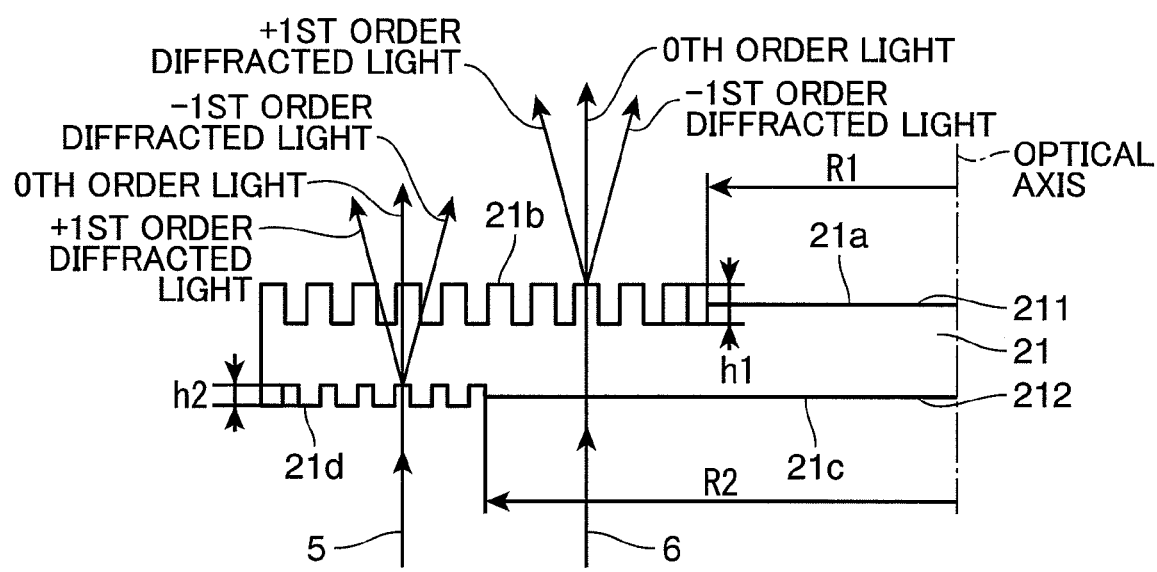
FIG. 11 is a sectional view of a diffraction aperture element according to a second embodiment of the present invention, showing a portion from the optical axis to one end in enlarged view.

FIG. 11 is a sectional view of a diffraction aperture element according to the second embodiment of the present invention, and shows a portion from the optical axis to one end in an enlarged view. In the diffraction aperture element 21 shown in FIG. 11, diffraction regions are provided on two surfaces 211, 212. One surface 211 has a plain region 21a in a circle of radius R1, and a first diffraction region 21b that has diffraction grating with a depth of h1 is formed outside the circle of radius R1, and the other surface 212 has a plain region 21c in a circle of radius R2 and a second diffraction region 21d that has diffraction grating with a depth of h2 formed outside the circle of radius R2. More specifically, the surface 211 has the first diffraction region 21*b* having an annular configuration of inner radius R1 with respect to the optical axis as a center with the diffraction grating formed with a depth h1. The first diffraction region 21*b* has an outer radius R2 (R2>R1) or larger. The surface 212 has a second diffraction region 21*d* of inner radius R2 with respect to the optical axis as a center with the diffraction grating formed with a depth of h2. The beam of wavelength $\lambda 3$ that passes the radius R1 is focused with the numerical aperture NA3 on the optical disk 53, and the light beam of wavelength $\lambda 2$ that passes the radius R2 is focused with the numerical aperture NA2 on the optical disk 52. The optical pickup has such a constitution as the diffraction aperture element 17 of the first embodiment is replaced with a diffraction aperture element 21 shown in FIG. 11 that performs the same operation. That is, the light beam 4 of wavelength $\lambda 1$ emitted by the blue laser 1 shown in FIG. 1 passes through the diffraction aperture element 21 of this embodiment, is subjected to aperture restriction by the aperture 18*a*, and is focused by the objective lens 16 with the numerical aperture of NA1 through the protective layer of thickness t1 on the information recording surface of the optical disk 51. The light beam 5 of wavelength $\lambda 2$ emitted by the red laser 2 is subjected to aperture restriction by the diffraction aperture element 21 of this embodiment, and is focused by the objective lens 16 with the numerical aperture of NA2 through the protective layer of thickness t2 on the information recording surface of the optical disk 52. The light beam 6 of wavelength $\lambda 3$ emitted by the infrared laser 3 is subjected to aperture restriction by the diffraction aperture element 21 of this embodiment, and is focused by the objective lens 16 with the numerical aperture of NA3 on the information recording surface of the optical disk 53. The light beams reflected by the optical disk 51, 52 or 53 are received by the photodetector 20 so that information signals are produced. By making use of the diffraction by the hologram 16*a*, the objective lens 16 is made possible to form a satisfactory light spot of the light beam 4 on the information recording surface of the optical disk 51 via the protective layer of thickness t1, form a satisfactory light spot of the light beam 5 on the information recording surface of the optical disk 52 via the protective layer of thickness t2, and form a satisfactory light spot of the light beam 6 on the information recording surface of the optical disk 53 via the protective layer of thickness t3.

The function of the diffraction aperture element 21 will be described below with reference to FIG. 11. In FIG. 11, the difference in optical path length that occurs when the light beams pass through the first diffraction region 21*b* is set to integer times the wavelengths $\lambda$ and $\lambda 2$ and integer times the wavelengths $\lambda 3$ plus a half wavelength, so that the light beam 4 of wavelength $\lambda 1$ and the light beam 5 of wavelength $\lambda 2$ are transmitted and the light beam 6 of wavelength $\lambda 3$ is diffracted. The numerical aperture may be set to NA3 by applying aperture restriction as the light beam 6 is diffracted. When BK7 is used to form the diffraction aperture element 21 and the depth h1 of the diffraction grating is set to 3.82 μm, the same as the depth of the diffraction grating of the first diffraction region 17*b* of the first embodiment, the difference in optical path length is five wavelengths where the intensity is the same as that at 0 wavelengths for the wavelength $\lambda$ of 405 nm, similar to the first embodiment. When the wavelength $\lambda$ is 655 nm, the difference in optical path length is three wavelengths where the intensity is the same as that at 0 wavelengths. As a result, nearly 100% of the light beam 4 of wavelength $\lambda 1$ and the light beam 5 of wavelength $\lambda 2$ are transmitted, as shown in FIG. 4. When the wavelength $\lambda$ is 780 nm, the difference in optical path length is 2.5 wavelengths where the intensity is the same as that at 0.5 wavelengths, and nearly 100% of the light beam 6 of wavelength $\lambda 3$ is diffracted and 0th order light is not transmitted and, as a result, aperture restriction with the numerical aperture NA3 can be applied to the light beam 6.

The light beam 4 of wavelength $\lambda 1$ can be transmitted while the light beam 5 of wavelength $\lambda 2$ can be diffracted, by setting the difference in optical path length that is produced in the second diffraction region 21*d* to integer times the wavelengths $\lambda$ and integer times the wavelength $\lambda 2$ plus a half wavelength. Diffracting the light beam 5 enables it to apply aperture restriction with the numerical aperture NA2 to the light beam 5. When the depth h2 of the diffraction grating is set to 0.70 μm, similar to the case of the second diffraction region 17*c* of the first embodiment, the difference in optical path length becomes 0.92 wavelengths when the wavelength $\lambda$ is 405 nm and approximately 95% of the light beam 4 of wavelength $\lambda 1$ is transmitted. When the wavelength $\lambda$ is 655 nm, the difference in optical path length becomes 0.55 wavelengths, and therefore approximately 97.5% of the light beam 5 of wavelength $\lambda 2$ is diffracted, and the numerical aperture can be set to NA2. In the second diffraction region 21*d*, it is not possible to diffract 100% of the light beam 5 of wavelength $\lambda 2$ at the same time, and 2 to 3% of the light is transmitted as 0th order light, although this does not pose a problem in practice.

When the depth h2 of the diffraction grating of the second diffraction region 21*d* is set to 3.12 μm, similar to the first embodiment, the difference in optical path length which the light beam 4 of wavelength $\lambda 1$ undergoes becomes equal to 0.08 wavelengths so that approximately 95% of the light is transmitted, and the difference in phase which the light beam 5 of wavelength $\lambda 2$ undergoes becomes equal to 0.45 wavelengths so that approximately 97.5% of the light is diffracted, thus making it possible to apply aperture restriction to the numerical aperture NA2. When the depth h2 of the diffraction grating is set to 4.52 μm, the difference in optical path length which the light beam 4 of wavelength $\lambda 1$ undergoes becomes equal to 0.9 wavelengths so that approximately 95% of the light is transmitted, and the difference in optical path which the light beam 5 of wavelength $\lambda 2$ undergoes becomes equal to 0.55 wavelengths so that approximately 97.5% of the light is diffracted, thus making it possible to apply aperture restriction to the numerical aperture NA2.

While an example of using BK7 to form the diffraction aperture element 21 has been described above, there is no restriction on the material, similar to the case of the first embodiment.

Figure 12:
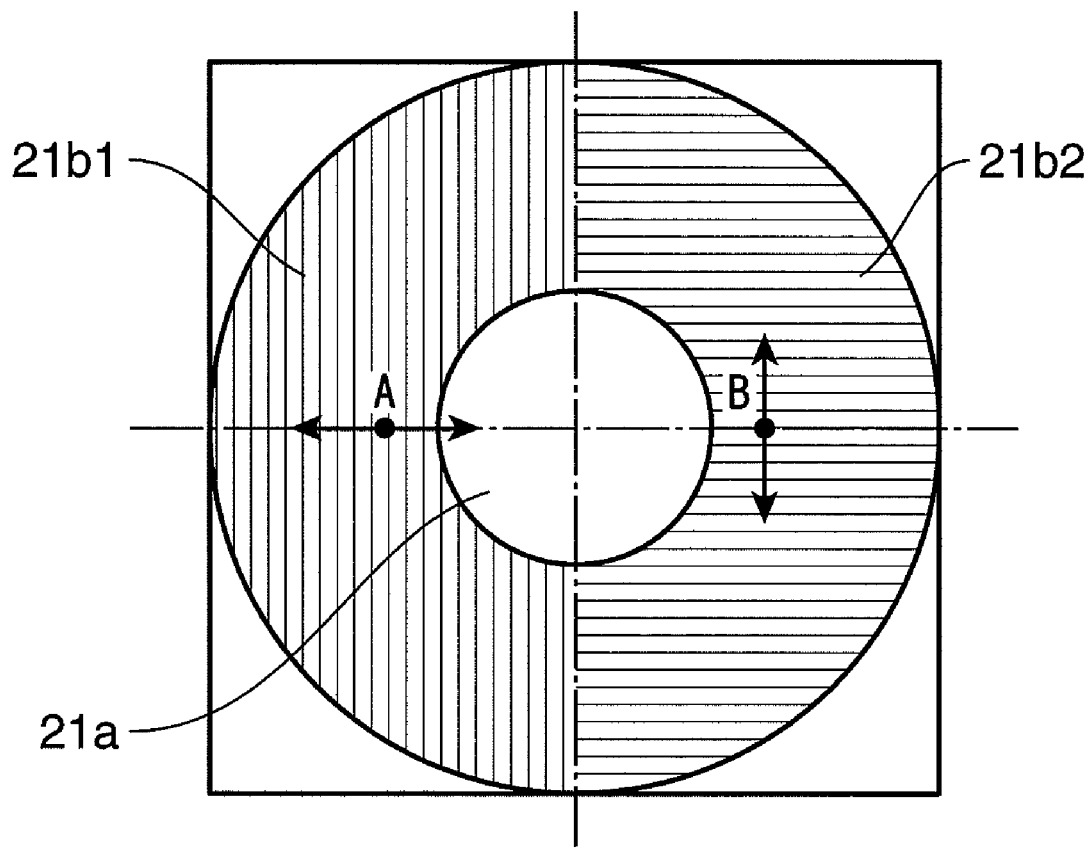
FIG. 12 is a schematic view showing the diffraction grating pattern of a first diffraction region of the diffraction aperture element according to the second embodiment of the present invention.

The first diffraction region 21*b* is constituted so that the light beam 6 of wavelength $\lambda 3$ is diffracted asymmetrically with respect to the optical axis, and the second diffraction region 21*d* is constituted so that the light beam 5 of wavelength $\lambda 2$ is diffracted asymmetrically with respect to the optical axis. This constitution will be described with reference to FIG. 12 and FIG. 13, which are front views of the surface 211 and the surface 212 of the diffraction aperture element 21, schematically showing the diffraction grating patterns. In FIG. 12, the first diffraction region 21*b* is divided into two regions 21*b*1 and 21*b*2, with the diffraction grating patterns thereof crossing each other perpendicularly as shown in FIG. 12. The light beam 6 incident on the region 21*b*1 is diffracted in direction A when viewed from the front of the surface 211 so as to generate diffracted light of a plurality of orders, passes through the objective lens 16, is reflected by the optical disk 53, passes through the objective lens 16 again and enters the region 21*b*2. Since the direction of diffraction in the region 21*b*2 is perpendicular to that of the region 21*b*1, the light does not return to the same optical path as that of the light beam 6 that passes through the plain region 21a. The light beam 6 incident on the region 21b2 is diffracted in direction B so as to generate diffracted light of a plurality of orders. While the light is reflected on the optical disk 53 and enters the region 21b1, it does not return to the same optical path as that of the light beam 6 that passes through the plain region 21a because the directions of diffraction are perpendicular to each other.

Figure 13:
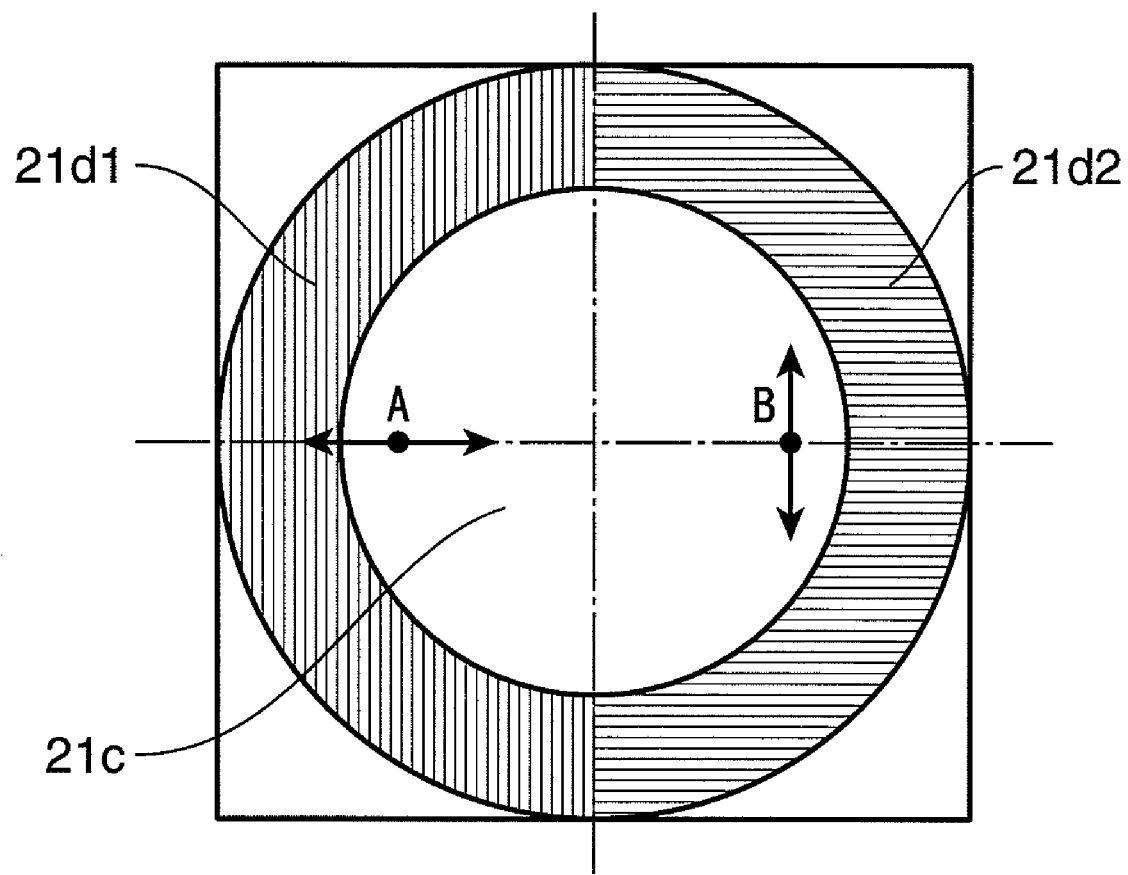
FIG. 13 is a schematic view showing the diffraction grating pattern of a second diffraction region of the diffraction aperture element according to the second embodiment of the present invention.

In FIG. 13, the second diffraction region 21d is divided into two regions 21d1 and 21d2, with the directions of the diffraction gratings crossing each other perpendicularly as shown in the drawing. The light beam 5 incident on the region 21d1 is diffracted in direction A when viewed from the front of the surface 212 so as to generate diffracted light of a plurality of orders, passes through the objective lens 16, is reflected by the optical disk 52, passes through the objective lens 16 again and enters the region 21d2. Since the direction of diffraction in the region 21d2 is perpendicular to that of the region 21d1, the light does not return to the same optical path as that of the light beam 5 that passes through the plain region 21c. The light beam 5 incident on the region 21d2 is diffracted in direction B so as to generate diffracted light of a plurality of orders. While the light is reflected by the optical disk 52 and enters the region 21d1, it does not return to the same optical path as that of the light beam 5 that passes through the plain region 21c because the directions of diffraction are perpendicular to each other.

In this embodiment, since the diffraction regions are separated for the light beam 5 and the light beam 6, proper value of the difference in optical path length can be given to each light beam. While the diffraction efficiency of the light beam is described as approximately 97.5% in the above description, the efficiency can be increased to near 100% by setting the difference in optical path length to a half wavelength.

As described above, the present invention makes it possible to apply aperture restriction to the light beams 5, 6 which are focused on the optical disks 52, 53 and to the light beams 5, 6 reflected by the optical disks 52, 53. The diffraction gratings designed to effect asymmetrical diffraction may be formed in such patterns as according to the first embodiment with reference to FIGS. 8, 9, 10. While the directions of diffraction are perpendicular to each other on both sides of the optical axis, the directions may not necessarily be perpendicular to each other. The directions may be set so that the diffracted beams do not return to the same optical paths as those of the light beams 6, 5 that pass through the plain regions 21a, 21c.

Aperture restriction is applied to the light beam 4 of wavelength λ1 so that the numerical aperture becomes NA1 by means of the aperture 18a of the lens barrel 18, aperture restriction is applied to the light beam 5 of wavelength λ2 so that the numerical aperture becomes NA2 by means of the second diffraction region 21d of the diffraction aperture element 21, and aperture restriction is applied to the light beam 6 of wavelength λ3 so that the numerical aperture becomes NA3 by means of the first diffraction region 21b of the diffraction aperture element 21, thereby setting the numerical apertures for the light beams 4, 5, 6 that are focused on the optical disks 51, 52, 53, respectively.

In this embodiment also, the diffraction aperture element 21 may be constituted separately from the objective lens 16, similar to the first embodiment, or may be formed on the surface of the objective lens 16.

According to this embodiment, in the optical pickup that records/reproduces information on/from the plurality of optical disks of different types by using light beams having different wavelengths, numerical aperture can be set for the light beams that are focused on the optical disks by using the diffraction aperture element, thereby ensuring satisfactory aperture characteristics. Since the diffraction aperture element can be mass produced by the injection molding method, an optical pickup that is inexpensive and has practical value can be provided.

Third Embodiment

Figure 14:
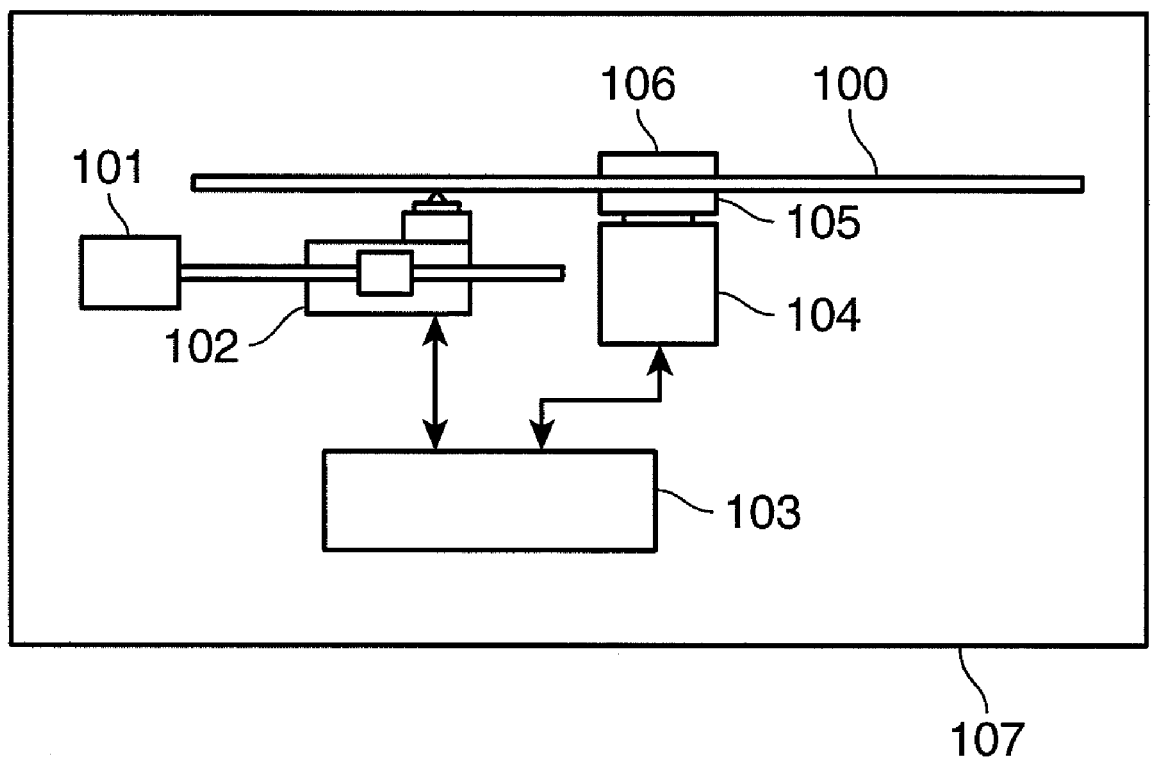
FIG. 14 shows the schematic constitution of an optical disk device according to a third embodiment of the present invention.

FIG. 14 shows the schematic constitution of an optical disk device that employs the optical pickup of the first embodiment or the second embodiment. The optical disk device 107 comprises a drive device 101, an optical head 102, an electrical circuit 103, a motor 104 and a turntable 105. In FIG. 14, an optical disk 100 is placed on the turntable 105, and is driven by the motor 104 to rotate. The optical pickup 102 according to the first embodiment or the second embodiment is transferred by the drive device 101 to a track of the optical disk 100 where desired information is recorded.

The optical pickup 102 sends a focusing error signal or a tracking error signal according to the positional relationship with the optical disk 100 to the electrical circuit 103. In accordance to the signal, the electrical circuit 103 sends a signal to the optical pickup 102 for driving the objective lens. The optical pickup 102 uses this signal to control focusing and tracking of the optical disk 100 so as to read, write or delete information accordingly.

In the description above, the optical disk 100 has a protective layer of thickness t1, t2 or t3. The optical disk device 107 of this embodiment employs the optical pickup of the first embodiment or the second embodiment, and therefore can deal with a plurality of optical disks of different recording densities by using a single optical pickup.

Fourth Embodiment

Figure 15:
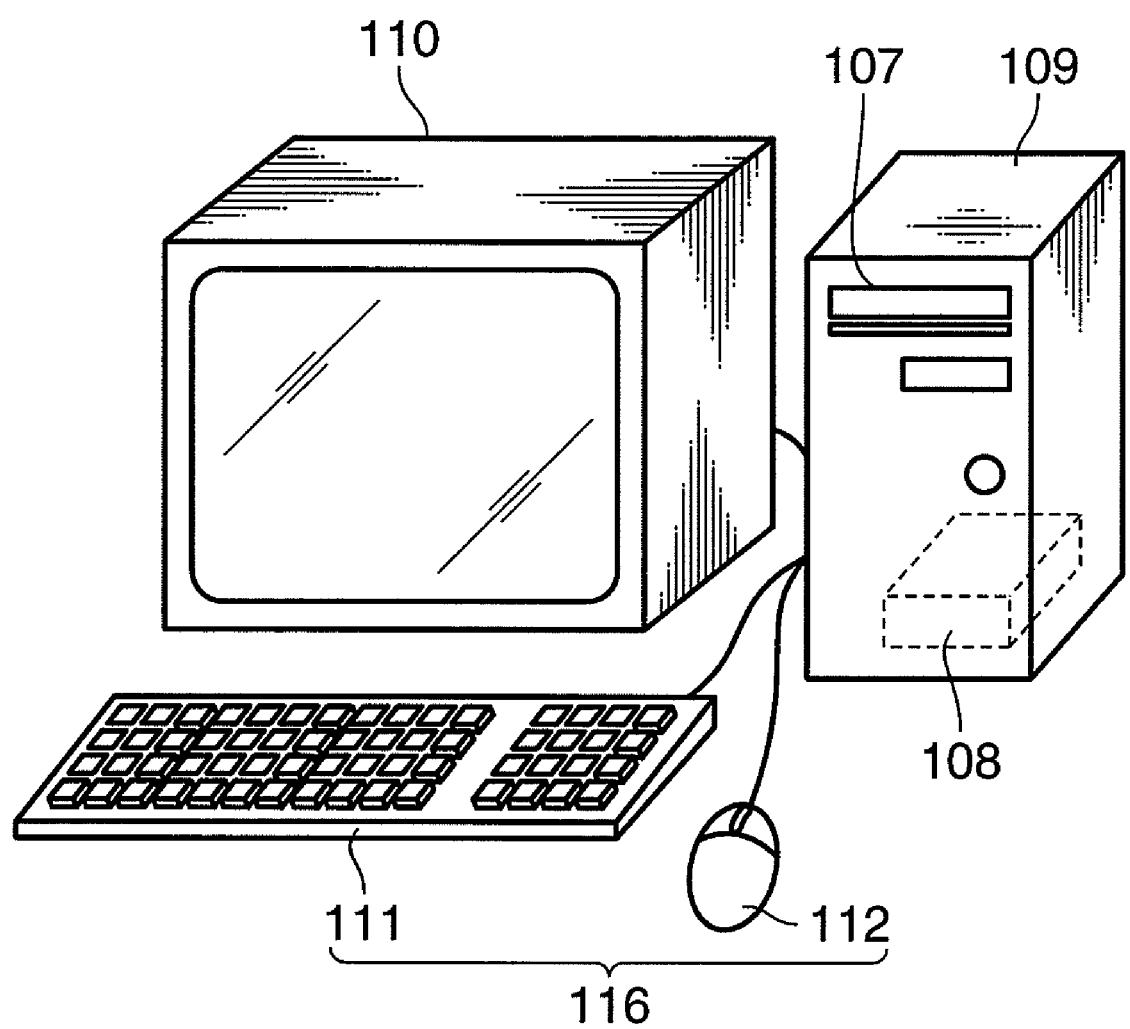
FIG. 15 is a schematic perspective view of a computer according to a fourth embodiment of the present invention.

This embodiment is a computer comprising the optical disk device of the third embodiment. FIG. 15 is a perspective view of the computer of this embodiment. The computer 109 shown in FIG. 15 comprises the optical disk device 107 of the third embodiment, an input device 116 such as a keyboard 111 or a mouse 112 used to enter information, an arithmetic operation unit 108 such as a CPU that carries out arithmetic operation in accordance to the information that has been read from the optical disk device 107, and an output device 110 such as a cathode-ray tube or a liquid crystal display device that displays the information produced by the arithmetic operation unit 108 through the arithmetic operation.

The computer 109 may also have such a constitution that consists of only the optical disk device 107 and the arithmetic operation unit 108, without the input device 116 and the output device 110. The computer 109 may also have an input/output terminal of wired or wireless connection for the input of information to be recorded in the optical disk device 107 and output of information that is read by the optical disk device 107.

The computer 109 of this embodiment has the optical disk device 107 of the third embodiment and is capable of recording or reproducing information on/from optical disks of different types reliably, and therefore has broad applications.

Fifth Embodiment

Figure 16:
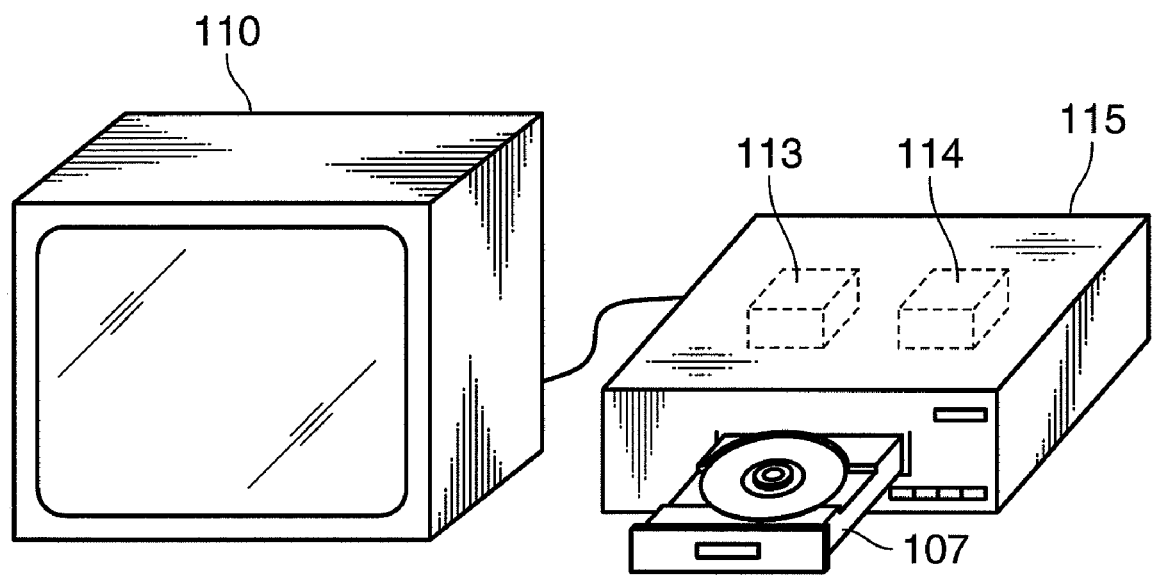
FIG. 16 is a schematic perspective view of an optical disk recorder according to a fifth embodiment of the present invention.
Figure 17:
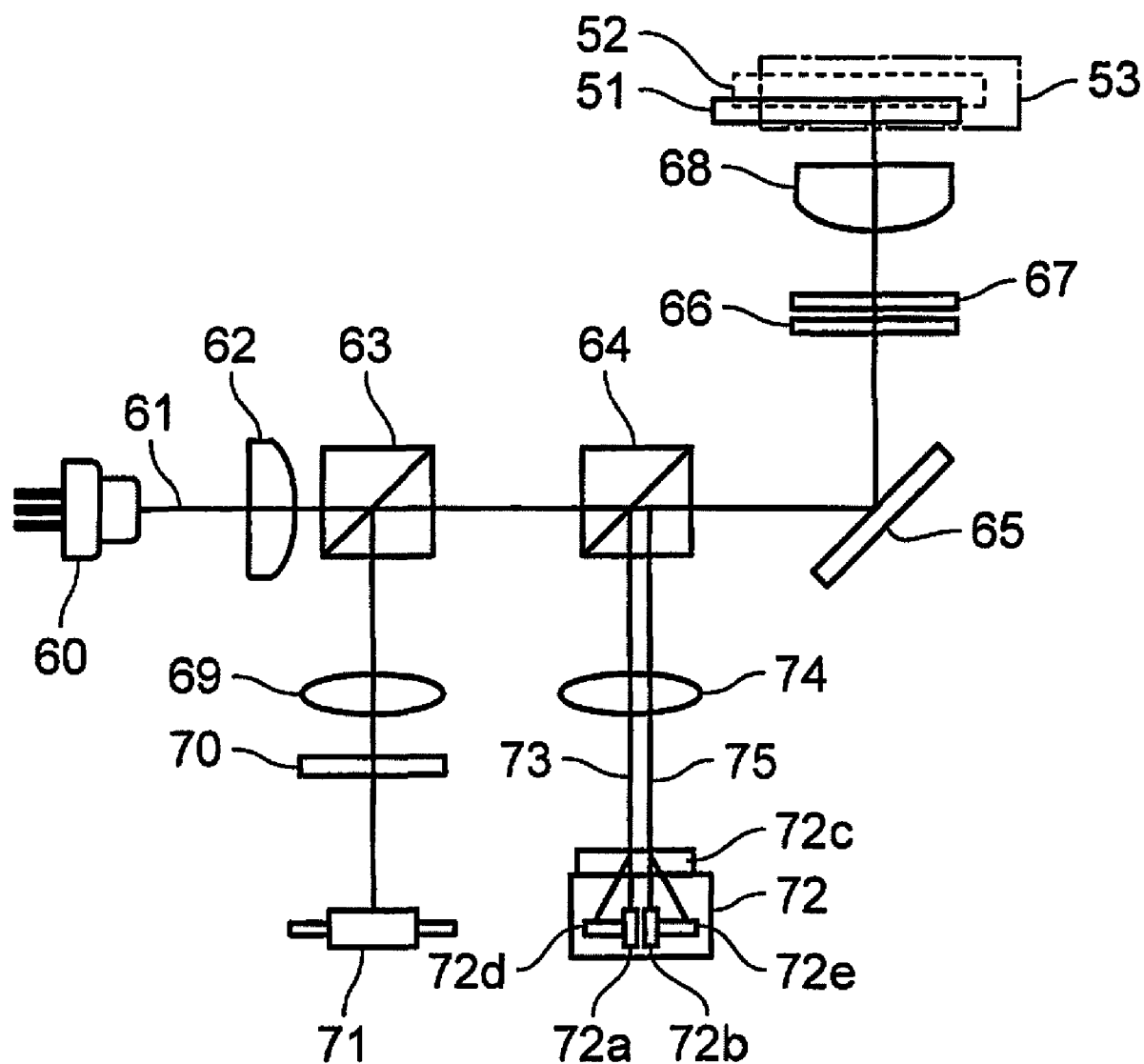
FIG. 17 shows the schematic constitution of an example of an optical pickup of the prior art.
Figure 18:
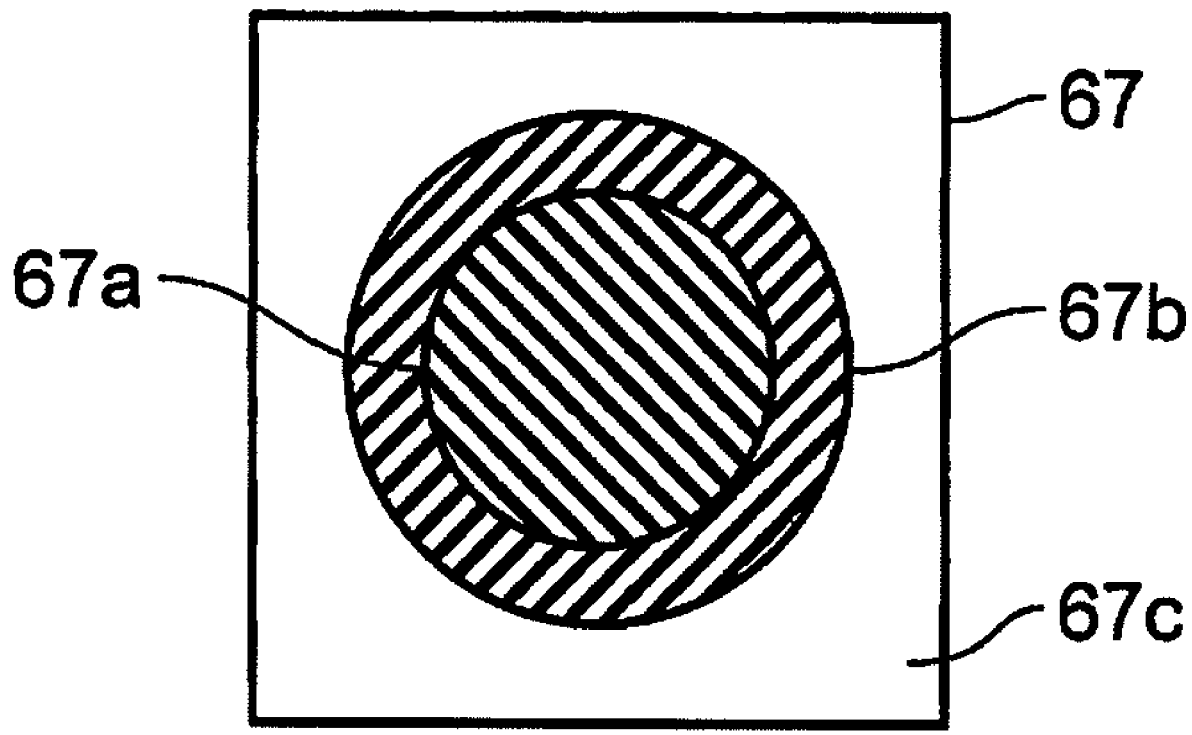
FIG. 18 is a plan view of a wavelength selective aperture of the optical pickup of the prior art.
Figure 19:
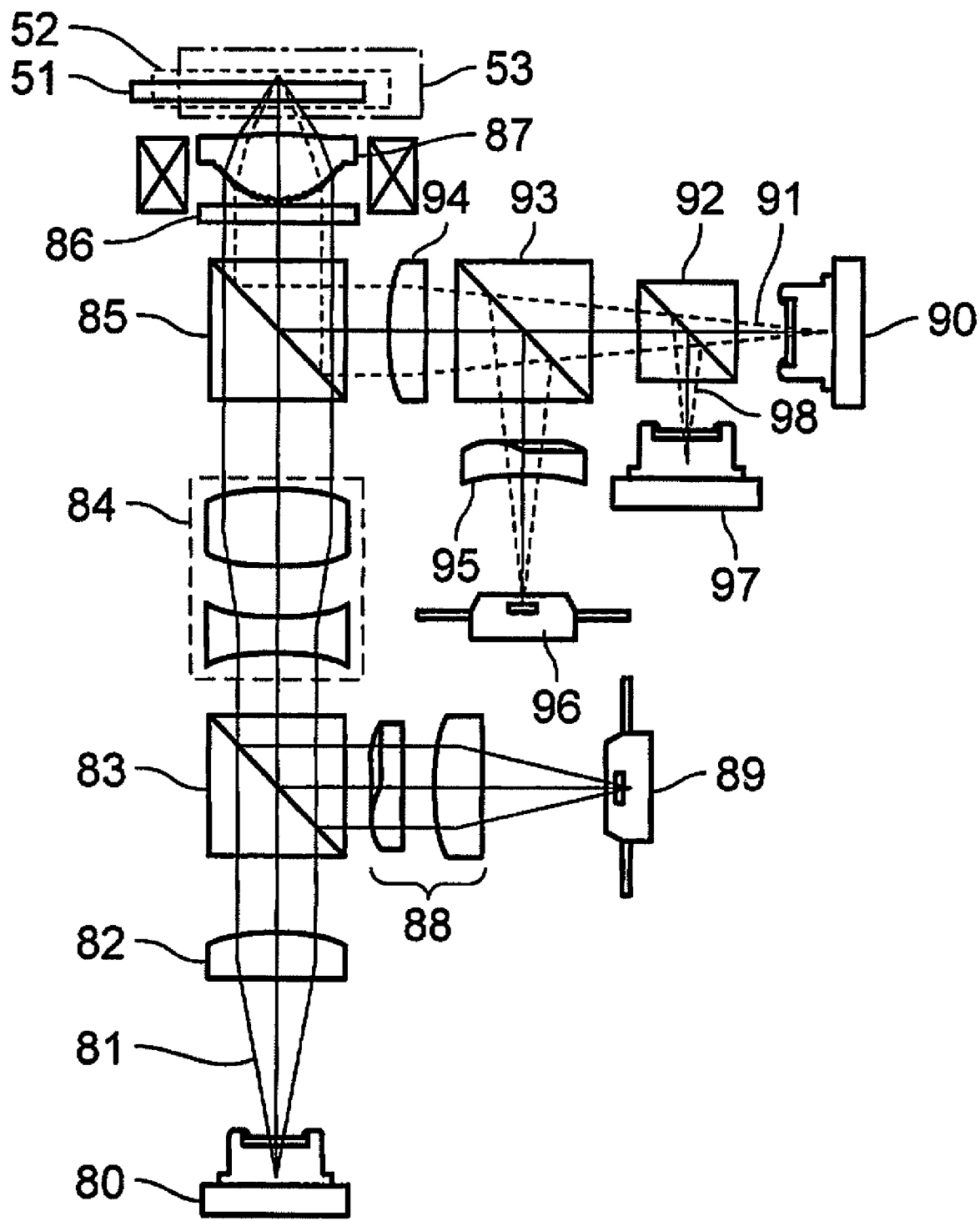
FIG. 19 shows the schematic constitution of another example of an optical pickup of the prior art.
Figure 20A:
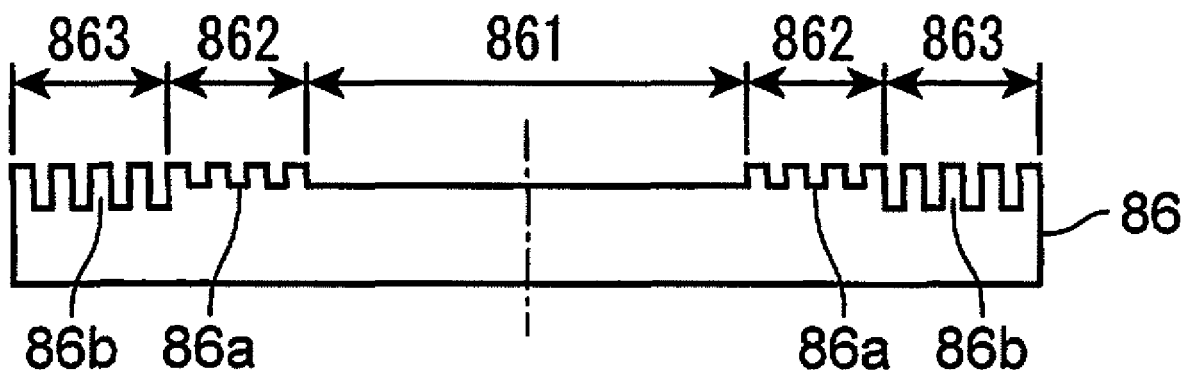
FIG. 20A is a sectional view of a diffraction optical element of an optical pickup of the prior art.
Figure 20B:
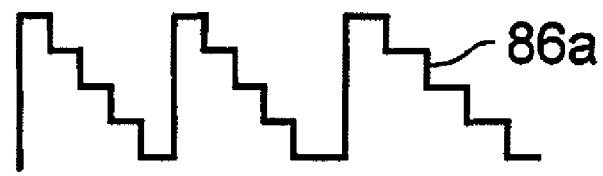
FIG. 20B is an enlarged view of a part of the optical pickup shown in FIG. 20A.

This embodiment is an optical disk recorder comprising the optical disk device 107 of the third embodiment. FIG. 16 is a perspective view of the optical disk recorder of this embodiment. The optical disk recorder 115 shown in FIG. 16 comprises the optical disk device 107 of the third embodiment, and a recording signal processing circuit 113 that transforms image signals into information signals to be recorded on an optical disk by means of the optical disk device 107.

It is preferable that the optical disk recorder 115 also has a reproducing signal processing circuit 114 that transforms the information signals that are obtained from the optical disk device 107 into image signals. Such a constitution enables it also to reproduce the information that has been recorded. An output device 110 such as a cathode-ray tube or a liquid crystal display device that displays the information may also be provided.

The optical disk recorder 115 of this embodiment has the optical disk device 107 of the third embodiment and is capable of recording or reproducing information on/from optical disks of different types reliably, and therefore has broad applications.

The embodiments described above include the present invention having the following constitution.

The optical pickup according to the first preferable constitution of the present invention comprises the first light source that emits light of wavelength $\lambda 1$, the second light source that emits light of wavelength $\lambda 2$, the third light source that emits light of wavelength $\lambda 3$, the objective lens that focuses the light of wavelength $\lambda 1$ onto the first optical disk having the protective layer of thickness t1, focuses the light of wavelength $\lambda 2$ onto the second optical disk having the protective layer of thickness t2 and focuses the light of wavelength $\lambda 3$ onto the third optical disk having the protective layer of thickness t3, the photodetector that detects light reflected by the optical disk, and the diffraction aperture element that transmits or diffracts the light emitted by the light sources and the light reflected by the optical disk, wherein the diffraction aperture element has the first diffraction region of annular configuration whose the inner radius is R1 and the outer radius is R2 (R2>R1) or more with respect to an optical axis as a center and the second diffraction region of annular configuration whose the inner radius is R2 with respect to the optical axis as the center, the first diffraction region being constituted such that the light of wavelength $\lambda 1$ and the light of wavelength $\lambda 2$ are transmitted and the light of wavelength $\lambda 3$ is diffracted asymmetrically with respect to the optical axis, and the second diffraction region being constituted such that the light of wavelength $\lambda 1$ is transmitted and the light of wavelength $\lambda 2$ is diffracted asymmetrically with respect to the optical axis.

The optical pickup described above is capable of applying aperture restriction to both the light emitted by the light source and the light reflected by the optical disk, by such a constitution as the directions of diffraction in the first and second diffraction regions of the diffraction aperture element are asymmetrical with respect to the optical axis in the optical system that uses the three wavelengths $\lambda 1$, $\lambda 2$ and $\lambda 3$.

In the optical pickup described above, it is preferable that the first and second diffraction regions are formed on one surface of the diffraction aperture element, and the outer radius of the first diffraction region from the optical axis is R2.

With this constitution, there is no possibility of the diffracted light being received by the photodetector, since the diffracted light generated by aperture restriction of the diffraction aperture element does not take the same optical path as the light passing through the aperture even when it is reflected by the optical disk and is diffracted again in the diffraction aperture element.

In the optical pickup described above, it is preferable that the first diffraction region is formed on one surface of the diffraction aperture element, and the second diffraction region is formed on the other surface of the diffraction aperture element.

With this constitution, there is no possibility of the diffracted light being received by the photodetector, since the diffracted light generated by aperture restriction of the diffraction aperture element does not take the same optical path as the light passing through the aperture even when it is reflected by the optical disk and is diffracted again in the diffraction aperture element. Also optimum diffraction of the light having wavelengths $\lambda 2$ and $\lambda 3$ is made possible since the first diffraction region and the second diffraction region are formed on different surfaces.

In the optical pickup described above, it is preferable that the diffraction aperture element is provided separately from the objective lens.

This constitution makes it possible to mass produce the diffraction aperture element and reduce the production cost.

In the optical pickup described above, when the objective lens focuses the light of wavelength $\lambda 1$ with the numerical aperture of NA1 on the first optical disk, focuses the light of wavelength $\lambda 2$ with the numerical aperture of NA2 on the second optical disk and focuses the light of wavelength $\lambda 3$ with the numerical aperture of NA3 on the third optical disk, it is preferable that the light of wavelength $\lambda 3$ passing through a position lying on the circle of inner radius R1 of the first diffraction region corresponds to the numerical aperture NA3, and the light beam having wavelength $\lambda 2$ passing through a position lying on the circle of inner radius R2 of the first diffraction region corresponds to the numerical aperture NA2.

This constitution makes it possible to apply aperture restriction so that the numerical aperture is NA3 for the light of wavelength $\lambda 3$ in the first diffraction region and the numerical aperture is NA2 for the light of wavelength $\lambda 2$ in the second diffraction region.

In the optical pickup described above, it is preferable that numerical apertures NA1, NA2 and NA3 satisfy the relationship NA1>NA2>NA3.

This constitution makes it possible to apply aperture restriction for the light addressed to the optical disks that use different numerical apertures for the objective lens.

In the optical pickup described above, it is preferable that the numerical aperture NA1 is 0.85, the numerical aperture NA2 is from 0.6 to 0.65 and the numerical aperture NA3 is from 0.45 to 0.5.

This constitution makes it possible to apply aperture restriction for the light beams addressed to a CD, a DVD and a BD that use different numerical apertures for the objective lens.

In the optical pickup described above, it is preferable that the first diffraction region is divided into a plurality of first regions by the direction of diffraction, while the direction of diffraction of the divided first region is different from the direction of diffraction of the first region located at a position located symmetrically thereto with respect to the optical axis, and the second diffraction region is divided into a plurality of second regions by the direction of diffraction, while the direction of diffraction of the divided second region is different from the direction of diffraction of the second region located at a position symmetrical with respect to the optical axis With this constitution, since the direction of diffraction of the light emitted by the light source in the diffraction aperture element does not agree with the direction of diffraction of the light reflected by the optical disk in the diffraction aperture element, the diffracted light is not received by the photodetector.

In the optical pickup described above, it is preferable that the first diffraction region is constituted such that the direction of diffraction of the first region is perpendicular to the direction of diffraction of the first region located at a position disposed symmetrically thereto with respect to the optical axis, and the second diffraction region is constituted such that the direction of diffraction of the second region is perpendicular to the direction of diffraction of the second region located at a position disposed symmetrically thereto with respect to the optical axis With this constitution, since the direction of diffraction of the light emitted by the light source in the diffraction aperture element and the direction of diffraction of the light reflected by the optical disk in the diffraction aperture element are perpendicular to each other, the diffracted light is not received by the photodetector.

In the optical pickup described above, it is preferable that the diffraction aperture element is constituted so as to satisfy the relationship:

$$k3 = h1 \times (n3-1)/\lambda 3$$

$$2.4 \leq k3 \leq 2.6$$

where n3 is the refractive index of the diffraction aperture element for light of wavelength $\lambda 3$ and h1 is the depth of the diffraction grating of the first diffraction region.

This constitution makes it possible to transmit the light beams of wavelengths $\lambda 1$ and $\lambda 2$ that pass through the first diffraction region and diffract the light beam of wavelength $\lambda 3$.

In the optical pickup described above, it is preferable that the diffraction aperture element is constituted so as to satisfy the relationship:

$$k2 = h2 \times (n2-1)/\lambda 2$$

$$0.4 \leq k2 \leq 0.6$$

where n2 is the refractive index of the diffraction aperture element for light of wavelength $\lambda 2$ and h2 is the depth of the diffraction grating of the second diffraction region.

This constitution makes it possible to transmit the light beam of wavelength $\lambda 1$ that passes through the second diffraction region and diffract the light beams of wavelengths $\lambda 2$ and $\lambda 3$.

In the optical pickup described above, it is preferable that the diffraction aperture element is constituted so as to satisfy the relationship:

$$k2 = h2 \times (n2-1)/\lambda 2$$

$$2.4 \leq k2 \leq 2.6$$

where n2 is the refractive index of the diffraction aperture element for light of wavelength $\lambda 2$ and h2 is the depth of the diffraction grating of the second diffraction region.

This constitution makes it possible to transmit the light beam of wavelength $\lambda 1$ that passes through the second diffraction region and diffract the light beam of wavelength $\lambda 2$.

In the optical pickup described above, it is preferable that the diffraction aperture element is constituted so as to satisfy the relationship:

$$k2 = h2 \times (n2-1)/\lambda 2$$

$$3.4 \leq k2 \leq 3.6$$

where n2 is the refractive index of the diffraction aperture element of light of wavelength $\lambda 2$ and h2 is the depth of the diffraction grating of the second diffraction region.

This constitution makes it possible to transmit the light beam of wavelength $\lambda 1$ that passes through the second diffraction region and diffract the light beam of wavelength $\lambda 2$.

In the optical pickup described above, it is preferable that thicknesses t1, t2 and t3 of the protective layers satisfy the relationship t1<t2<t3.

This constitution makes it possible to record/reproduce information on/from optical disks that have protective layers of different thicknesses.

In the optical pickup described above, it is preferable that thickness t1 of the protective layer is approximately 0.075 mm or approximately 0.1 mm, thickness t2 of the protective layer is approximately 0.6 mm and thickness t3 of the protective layer is approximately 1.2 mm.

This constitution makes it possible to record/reproduce information on/from optical disks of BD, DVD and CD specifications that have protective layers of different thicknesses.

In the optical pickup described above, it is preferable that the wavelength $\lambda 1$ lies within a wavelength band from 390 nm to 420 nm, the wavelength $\lambda 2$ lies within a wavelength band from 640 nm to 680 nm, and the wavelength $\lambda 3$ lies within a wavelength band from 750 nm to 830 nm.

This constitution makes it possible to record/reproduce information on/from optical disks of BD, DVD and CD specifications that use different wavelengths.

The optical disk device according to the second preferable constitution of the present invention comprises one of the optical pickups described above, a motor for driving the optical disk to rotate, and an electrical circuit that controls and drives at least one of the motor, an optical lens used in the optical pickup and the light source used in the optical pickup in accordance to the signals obtained from the optical head.

In the optical disk device described above, since the first optical disk, the second optical disk and the third optical disk are driven to rotate by the motor, and the electrical circuit that controls and drives at least one of the motor, the optical lens used in the optical pickup and the light source used in the optical pickup in accordance to the signals obtained from the optical head, the optical head can be applied to the optical disk device.

The computer according to the third preferable constitution of the present invention comprises the optical disk device described above, an arithmetic operation unit that carries out arithmetic operation in accordance to the information that has been input and information reproduced from the optical disk device, and an output device that outputs at least one of the information that has been input, the information reproduced from the optical disk device and the results of the arithmetic operation by the arithmetic operation unit.

In the computer described above, the arithmetic operation unit carries out arithmetic operation in accordance at least to the information that has been input through the input device or the input terminal and information reproduced from the optical disk device, and at least one of the information that has been input through the input device or the input terminal, the information reproduced from the optical disk device and the results of the arithmetic operation by the arithmetic operation unit is output via the output device or the output terminal, and therefore the optical head can be applied to the optical disk device.

The optical disk recorder according to the fourth preferable constitution of the present invention comprises the optical disk device described above, the recording signal processing circuit that transforms image information into signals to be recorded in the optical disk device and the reproducing signal processing circuit that transforms the signals that have been read from the optical disk device into image information.

In the optical disk recorder described above, since the recording signal processing circuit transforms the image information into signals to be recorded in the optical disk device and the reproducing signal processing circuit transforms the signals that have been obtained from the optical disk device into image information, the optical disk device having the optical head described above can be applied to the optical disk recorder.

The optical pickup of the present invention realizes the recording of information on and the reproduction of information from optical disks of different types by using a single objective lens. Even if the optical disks an optimum numerical aperture can be set and recording/reproducing information can be stably recorded. Accordingly, the optical pickup is suitable for optical disk devices, computers, optical disk recorders and the like that are the application thereof.

The invention claimed is:

1. An optical pickup comprising:
a first light source that emits light of wavelength $\lambda 1$;
a second light source that emits light of wavelength $\lambda 2$;
a third light source that emits light of wavelength $\lambda 3$;
an objective lens that focuses light of wavelength $\lambda 1$ onto a first optical disk having a protective layer of thickness t1, focuses light of wavelength $\lambda 2$ onto a second optical disk having a protective layer of thickness t2 and focuses light of wavelength $\lambda 3$ onto a third optical disk having a protective layer of thickness t3;
a detector that detects light reflected by the optical disk; and
a diffraction aperture element that transmits or diffracts the light emitted by the light sources and the light reflected by the optical disk, wherein
the diffraction aperture element has a first diffraction region of annular configuration whose an inner radius is R1 and an outer radius is R2 (R2>R1) or more with respect to an optical axis as a center and a second diffraction region of annular configuration whose an inner radius is R2 with respect to the optical axis as the center, the first diffraction region being constituted such that the light of wavelength $\lambda 1$ and the light of wavelength $\lambda 2$ are transmitted and the light of wavelength $\lambda 3$ is diffracted asymmetrically with respect to the optical axis, and the second diffraction region being constituted such that the light of wavelength $\lambda 1$ is transmitted and the light of wavelength $\lambda 2$ is diffracted asymmetrically with respect to the optical axis,
the first diffraction region is divided into a plurality of first regions by the direction of diffraction, while the direction of diffraction of the divided first region is different from the direction of diffraction of the first region that is located at a position disposed symmetrically thereto with respect to the optical axis, and
the second diffraction region is divided into a plurality of second regions by the direction of diffraction, while the direction of diffraction of the divided second region is different from the direction of diffraction of the second region that is located at a position disposed symmetrically thereto with respect to the optical axis.

2. The optical pickup according to claim 1, wherein the first and second diffraction regions are formed on one surface of the diffraction aperture element, and the outer radius of the first diffraction region from the optical axis is R2.

3. The optical pickup according to claim 1, wherein the first diffraction region is formed on one surface of the diffraction aperture element, and the second diffraction region is formed on the other surface of the diffraction aperture element.

4. The optical pickup according to claim 1, wherein the diffraction aperture element is provided separately from the objective lens.

5. The optical pickup according to claim 1, wherein, when the objective lens focuses the light of wavelength $\lambda 1$ a with a numerical aperture of NA1 on the first optical disk, focuses the light of wavelength $\lambda 2$ with a numerical aperture of NA2 on the second optical disk and focuses the light of wavelength $\lambda 3$ with a numerical aperture of NA3 on the third optical disk, the light of wavelength $\lambda 3$ that passes through a position lying on a circle of inner radius R1 of the first diffraction region corresponds to the numerical aperture NA3, and the light beam having wavelength $\lambda 2$ that passes through a position lying on a circle of inner radius R2 of the second diffraction region corresponds to the numerical aperture NA2.

6. The optical pickup according to claim 5, wherein the numerical apertures NA1, NA2 and NA3 satisfy a relationship NA1>NA2>NA3.

7. The optical pickup according to claim 6, wherein the numerical aperture NA1 is 0.85, the numerical aperture NA2 is from 0.6 to 0.65 and the numerical aperture NA3 is from 0.45 to 0.5.

8. The optical pickup according to claim 1, wherein the first diffraction region is constituted such that direction of the diffraction grating of the first region is perpendicular to the direction of the diffraction grating of the first region located at a position disposed symmetrically thereto with respect to the optical axis, and the second diffraction region is constituted such that direction of the diffraction grating of the second region is perpendicular to the direction of diffraction grating of the second region located at a position disposed symmetrically thereto with respect to the optical axis.

9. The optical pickup according to claim 1, wherein the diffraction aperture element is constituted so as to satisfy a relationship:

$$k3 = h1 \times (n3-1)/\lambda 3$$

$$2.4 \leq k3 \leq 2.6$$

where n3 is a refractive index of the diffraction aperture element to light of wavelength $\lambda 3$ and h1 is a depth of the diffraction grating of the first diffraction region.

10. The optical pickup according to claim 1, wherein the diffraction aperture element is constituted so as to satisfy a relationship:

$$k2 = h2 \times (n2-1)/\lambda 2$$

$$0.4 \leq k2 < \lambda 6$$

where n2 is a refractive index of the diffraction aperture element to light of wavelength $\lambda 2$ and h2 is a depth of the diffraction grating of the second diffraction region.

11. The optical pickup according to claim 1, wherein the diffraction aperture element is constituted so as to satisfy a relationship:

$$k2 = h2 \times (n2-1)/\lambda 2$$

$$2.4 < k2 < 2.6$$

where n2 is a refractive index of the diffraction aperture element to light of wavelength $\lambda 2$ and h2 is a depth of the diffraction grating of the second diffraction region.

12. The optical pickup according to claim 1, wherein the diffraction aperture element is constituted so as to satisfy a relationship:

$$k2 = h2 \times (n2-1)/\lambda 2$$

$$3.4 \leq k2 \leq 3.6$$

where n2 is a refractive index of the diffraction aperture element to light having wavelength λ2 and h2 is a depth of the diffraction grating of the second diffraction region.

13. The optical pickup according to claim 1, wherein thicknesses t1, t2 and t3 of the protective layers satisfy a relationship t1<t2<t3.

14. The optical pickup according to claim 13, wherein the thickness t1 of the protective layer is approximately 0.075 mm or approximately 0.1 mm, the thickness t2 of the protective layer is approximately 0.6 mm and the thickness t3 of the protective layer is approximately 1.2 mm.

15. The optical pickup according to claim 1, wherein the wavelength λ1 lies within a wavelength band from 390 nm to 420 nm, the wavelength λ2 lies within a wavelength band from 640 nm to 680 nm, and the wavelength λ3 lies within a wavelength band from 750 nm to 830 nm.

16. An optical disk device comprising:
the optical pickup according to claim 1;
a motor for driving the optical disk to rotate; and
an electrical circuit that controls and drives at least one of the motor, an optical lens used in the optical pickup and the light source used in the optical pickup in accordance to signals obtained from the optical head.

17. A computer comprising:
the optical disk device according to claim 16;
an arithmetic operation unit that carries out arithmetic operation in accordance to at least information that has been input and information reproduced from the optical disk device; and
an output device that outputs at least one of the input information, the information reproduced from the optical disk device and the results of the arithmetic operation by the arithmetic operation unit.

18. An optical disk recorder comprising:
the optical disk device according to claim 16;
a recording signal processing circuit that transforms image information into signals to be recorded in the optical disk device; and
a reproducing signal processing circuit that transforms the signals obtained from the optical disk device into image information.

* * * * *